(12) United States Patent
You

(10) Patent No.: US 9,201,212 B2
(45) Date of Patent: Dec. 1, 2015

(54) LENS MODULE

(71) Applicant: SAMSUNG ELECTRO-MECHANICS CO., LTD., Suwon-si (KR)

(72) Inventor: Ho Sik You, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 11 days.

(21) Appl. No.: 14/195,454

(22) Filed: Mar. 3, 2014

(65) Prior Publication Data

US 2015/0177483 A1    Jun. 25, 2015

(30) Foreign Application Priority Data

Dec. 19, 2013    (KR) ................ 10-2013-0159501

(51) Int. Cl.
*G02B 9/62* (2006.01)
*G02B 13/18* (2006.01)
*G02B 13/00* (2006.01)

(52) U.S. Cl.
CPC .............. *G02B 9/62* (2013.01); *G02B 13/0045* (2013.01)

(58) Field of Classification Search
CPC ...... G02B 9/62; G02B 13/002; G02B 13/0045
USPC .................................. 359/708, 713, 754–759
See application file for complete search history.

(56) References Cited

U.S. PATENT DOCUMENTS

| 8,477,431 | B2 | 7/2013 | Huang | |
|---|---|---|---|---|
| 2012/0243108 | A1 | 9/2012 | Tsai | |
| 2013/0120858 | A1 | 5/2013 | Sano | |
| 2014/0111876 | A1* | 4/2014 | Tang et al. | 359/757 |
| 2014/0211324 | A1* | 7/2014 | Ishizaka | 359/708 |
| 2015/0029599 | A1* | 1/2015 | Huang | 359/713 |

FOREIGN PATENT DOCUMENTS

| JP | 2006-163075 A | 6/2006 |
|---|---|---|
| WO | 2012/008357 A1 | 1/2012 |

* cited by examiner

*Primary Examiner* — Darryl J Collins
(74) *Attorney, Agent, or Firm* — NSIP Law

(57) ABSTRACT

There is provided a lens module including: a first lens having positive refractive power; a second lens having refractive power, both surfaces thereof being convex; a third lens having refractive power; a fourth lens having positive refractive power; a fifth lens having refractive power; and a sixth lens having positive refractive power and having one or more inflection point formed on an image-side surface thereof, wherein the first, second, third, fourth, fifth and sixth lenses are disposed in a sequential order from the first lens to the sixth lens.

57 Claims, 16 Drawing Sheets

| Surface | Radius | Thickness | Glass code |
|---|---|---|---|
| 1 | 1.668 | 0.484 | 544100.561 |
| 2 | 2.569 | 0.087 | |
| 3 | 2.402 | 0.404 | 544100.561 |
| 4 | −31.195 | 0.050 | |
| 5 | 9.945 | 0.250 | 638500.232 |
| 6 | 2.336 | 0.379 | |
| 7 | −12.218 | 0.473 | 638500.232 |
| 8 | −6.634 | 0.516 | |
| 9 | −2.105 | 0.417 | 638500.232 |
| 10 | −3.308 | 0.050 | |
| 11 | 1.964 | 1.025 | 534298.557 |
| 12 | 1.733 | 0.315 | |
| 13 | 0.000 | 0.300 | 525500.545 |
| 14 | 0.000 | 0.650 | |

FIG. 4

| Surface | S1 | S2 | S3 | S4 | S5 | S6 |
|---|---|---|---|---|---|---|
| R | 1.67E+00 | 2.57E+00 | 2.40E+00 | −3.12E+01 | 9.95E+00 | 2.34E+00 |
| K | −2.04E−01 | 0 | 0 | 0 | 0 | 1.45E+00 |
| A | −7.96E−03 | −1.07E−01 | −1.02E−01 | 2.94E−02 | 8.17E−03 | −4.18E−02 |
| B | −4.21E−03 | −6.11E−02 | −8.42E−02 | −2.01E−01 | −1.21E−01 | 3.79E−02 |
| C | −1.38E−02 | 1.06E−01 | 1.15E−01 | 5.25E−01 | 5.08E−01 | 5.82E−02 |
| D | 2.35E−02 | −1.98E−02 | 8.44E−02 | −7.60E−01 | −9.98E−01 | −1.72E−01 |
| E | −3.13E−02 | −3.25E−02 | −1.49E−01 | 5.17E−01 | 8.42E−01 | 1.39E−01 |
| F | 1.39E−02 | 2.72E−02 | 6.89E−02 | −1.23E−01 | −2.54E−01 | −1.82E−02 |
| G | | | | | | |
| Surface | S7 | S8 | S9 | S10 | S11 | S12 |
| R | −1.22E+01 | −6.63E+00 | −2.10E+00 | −3.31E+00 | 1.96E+00 | 1.73E+00 |
| K | 0 | 2.20E+01 | −2.39E+01 | −5.54E+00 | −1.72E+01 | −8.24E+00 |
| A | −5.23E−02 | 4.90E−03 | 3.98E−02 | 6.73E−02 | −6.45E−02 | −3.29E−02 |
| B | −4.26E−02 | −1.07E−01 | −1.19E−01 | −7.39E−02 | 1.89E−02 | 6.65E−03 |
| C | 9.43E−02 | 2.06E−01 | 6.75E−02 | 2.18E−02 | −2.87E−03 | −9.94E−04 |
| D | −1.10E−02 | −2.22E−01 | −3.08E−02 | 1.41E−03 | 2.45E−04 | 6.68E−05 |
| E | −1.26E−01 | 1.80E−01 | 1.81E−02 | −2.16E−03 | −8.98E−06 | −1.43E−06 |
| F | 1.54E−01 | −8.36E−02 | −6.25E−03 | 4.46E−04 | | |
| G | −7.21E−02 | 1.53E−02 | 7.82E−04 | −3.00E−05 | | |

FIG. 5

| Surface | Radius | Thickness | Glass code |
|---|---|---|---|
| 1 | 1.683 | 0.460 | 544100.561 |
| 2 | 2.356 | 0.082 | |
| 3 | 2.203 | 0.409 | 544100.561 |
| 4 | −116.917 | 0.050 | |
| 5 | 8.921 | 0.250 | 638500.232 |
| 6 | 2.272 | 0.391 | |
| 7 | −14.523 | 0.350 | 544100.561 |
| 8 | −6.308 | 0.454 | |
| 9 | −2.060 | 0.452 | 638500.232 |
| 10 | −2.871 | 0.050 | |
| 11 | 2.003 | 1.180 | 534298.557 |
| 12 | 1.720 | 0.322 | |
| 13 | 0.000 | 0.300 | 525500.545 |
| 14 | 0.000 | 0.650 | |

FIG. 9

| Surface | S1 | S2 | S3 | S4 | S5 | S6 |
|---|---|---|---|---|---|---|
| R | 1.68E+00 | 2.36E+00 | 2.20E+00 | −1.17E+02 | 8.92E+00 | 2.27E+00 |
| K | −1.77E−01 | 0 | 0 | 0 | 0 | 1.14E+00 |
| A | −6.01E−03 | −1.07E−01 | −1.03E−01 | 5.03E−03 | −2.46E−02 | −4.70E−02 |
| B | −4.74E−03 | −7.82E−02 | −9.91E−02 | −1.38E−01 | −4.57E−02 | 5.81E−02 |
| C | −3.88E−03 | 1.61E−01 | 1.60E−01 | 4.36E−01 | 3.86E−01 | 4.95E−02 |
| D | 4.79E−03 | −1.58E−01 | −5.06E−02 | −7.22E−01 | −9.33E−01 | −2.41E−01 |
| E | −1.50E−02 | 1.21E−01 | 3.11E−02 | 5.81E−01 | 8.62E−01 | 2.40E−01 |
| F | 7.19E−03 | −3.64E−02 | −7.66E−03 | −1.75E−01 | −2.87E−01 | −6.90E−02 |
| G | | | | | | |
| Surface | S7 | S8 | S9 | S10 | S11 | S12 |
| R | −1.45E+01 | −6.31E+00 | −2.06E+00 | −2.87E+00 | 2.00E+00 | 1.72E+00 |
| K | 0 | 2.20E+01 | −2.39E+01 | −5.54E+00 | −1.72E+01 | −8.24E+00 |
| A | −5.83E−02 | 3.69E−02 | 1.05E−01 | 7.47E−02 | −7.87E−02 | −2.91E−02 |
| B | −2.01E−01 | −2.99E−01 | −1.99E−01 | −9.73E−02 | 1.62E−02 | 5.08E−03 |
| C | 5.87E−01 | 5.54E−01 | 1.46E−01 | 5.01E−02 | −5.35E−04 | −7.78E−04 |
| D | −8.90E−01 | −6.09E−01 | −5.67E−02 | −1.22E−02 | −1.24E−04 | 5.23E−05 |
| E | 8.86E−01 | 4.73E−01 | 1.37E−02 | 1.23E−03 | 9.21E−06 | −1.09E−06 |
| F | −4.95E−01 | −2.14E−01 | −2.17E−03 | 2.25E−05 | | |
| G | 1.04E−01 | 3.95E−02 | 1.82E−04 | −9.95E−06 | | |

FIG. 10

| Surface | Radius | Thickness | Glass code |
|---|---|---|---|
| 1 | 1.852 | 0.478 | 544100.561 |
| 2 | 8.783 | 0.056 | |
| 3 | 6.742 | 0.377 | 544100.561 |
| 4 | -27.538 | 0.050 | |
| 5 | 6.186 | 0.250 | 638500.232 |
| 6 | 2.242 | 0.482 | |
| 7 | -13.416 | 0.350 | 638500.232 |
| 8 | -5.854 | 0.431 | |
| 9 | -1.665 | 0.350 | 638500.232 |
| 10 | -2.487 | 0.093 | |
| 11 | 1.833 | 1.038 | 534298.557 |
| 12 | 1.659 | 0.302 | |
| 13 | 0.000 | 0.300 | 525500.545 |
| 14 | 0.000 | 0.703 | |

FIG. 14

| Surface | S1 | S2 | S3 | S4 | S5 | S6 |
|---|---|---|---|---|---|---|
| R | 1.85E+00 | 8.78E+00 | 6.74E+00 | -2.75E+01 | 6.19E+00 | 2.24E+00 |
| K | -4.24E-01 | 0 | 0 | 0 | 0 | 1.56E+00 |
| A | -1.41E-02 | -7.08E-02 | -4.17E-02 | -8.82E-02 | -1.44E-01 | -9.63E-02 |
| B | -1.90E-02 | 2.98E-02 | 4.20E-02 | 2.53E-01 | 3.55E-01 | 1.70E-01 |
| C | 1.29E-02 | 4.26E-02 | 1.02E-01 | -4.45E-01 | -5.20E-01 | -1.62E-01 |
| D | -5.44E-02 | -4.33E-02 | -1.25E-01 | 3.84E-01 | 3.77E-01 | 9.23E-02 |
| E | 5.26E-02 | 2.97E-02 | 8.02E-02 | -1.77E-01 | -9.48E-02 | -2.32E-02 |
| F | -1.50E-02 | -7.20E-03 | -2.56E-02 | 4.00E-02 | -1.11E-03 | 1.77E-02 |
| G | | | | | | |
| Surface | S7 | S8 | S9 | S10 | S11 | S12 |
| R | -1.34E+01 | -5.85E+00 | -1.66E+00 | -2.49E+00 | 1.83E+00 | 1.66E+00 |
| K | 0 | 1.66E+01 | -1.50E+01 | -2.76E+00 | -1.37E+01 | -7.81E+00 |
| A | -8.56E-02 | 1.02E-03 | 1.60E-01 | 1.80E-01 | -7.73E-02 | -3.50E-02 |
| B | -9.00E-02 | -1.96E-01 | -2.83E-01 | -1.96E-01 | 1.59E-02 | 5.75E-03 |
| C | 1.46E-01 | 2.92E-01 | 2.27E-01 | 1.25E-01 | -4.35E-04 | -9.27E-04 |
| D | -3.34E-02 | -2.48E-01 | -1.10E-01 | -5.04E-02 | -1.69E-04 | 7.33E-05 |
| E | -1.57E-01 | 1.52E-01 | 3.37E-02 | 1.25E-02 | 1.33E-05 | -1.97E-06 |
| F | 2.04E-01 | -5.23E-02 | -5.86E-03 | -1.72E-03 | | |
| G | -8.72E-02 | 6.73E-03 | 4.28E-04 | 9.91E-05 | | |

FIG. 15

| Surface | Radius | Thickness | Glass code |
|---|---|---|---|
| 1 | 1.869 | 0.488 | 544100.561 |
| 2 | 17.462 | 0.050 | |
| 3 | 8.718 | 0.368 | 544100.561 |
| 4 | -19.658 | 0.050 | |
| 5 | 7.316 | 0.250 | 638500.232 |
| 6 | 2.311 | 0.573 | |
| 7 | -12.276 | 0.350 | 638500.232 |
| 8 | -6.913 | 0.341 | |
| 9 | -2.032 | 0.400 | 638500.232 |
| 10 | -3.065 | 0.067 | |
| 11 | 1.941 | 1.049 | 534298.557 |
| 12 | 1.712 | 0.315 | |
| 13 | 0.000 | 0.300 | 525500.545 |
| 14 | 0.000 | 0.718 | |

FIG. 19

| Surface | S1 | S2 | S3 | S4 | S5 | S6 |
|---|---|---|---|---|---|---|
| R | 1.87E+00 | 1.75E+01 | 8.72E+00 | -1.97E+01 | 7.32E+00 | 2.31E+00 |
| K | -7.17E-01 | 0 | 0 | 0 | 0 | 1.69E+00 |
| A | -1.87E-02 | -1.24E-01 | -7.01E-02 | 2.21E-02 | -4.29E-02 | -7.22E-02 |
| B | -2.77E-02 | 1.49E-01 | 1.95E-01 | -1.90E-02 | 1.28E-02 | 6.84E-02 |
| C | 1.21E-02 | -8.86E-02 | -6.74E-02 | -1.69E-02 | 1.13E-02 | -3.79E-02 |
| D | -6.39E-02 | 3.87E-03 | -6.26E-02 | -5.65E-02 | -5.09E-02 | 9.57E-02 |
| E | 6.64E-02 | 3.75E-02 | 1.08E-01 | 1.18E-01 | 1.02E-01 | -1.09E-01 |
| F | -1.99E-02 | -1.85E-02 | -5.72E-02 | -6.39E-02 | -4.91E-02 | 6.50E-02 |
| G | | | | | | |
| Surface | S7 | S8 | S9 | S10 | S11 | S12 |
| R | -1.23E+01 | -6.91E+00 | -2.03E+00 | -3.07E+00 | 1.94E+00 | 1.71E+00 |
| K | 0 | 2.32E+01 | -2.43E+01 | -2.12E+00 | -1.56E+01 | -7.83E+00 |
| A | -8.95E-02 | 1.96E-02 | 1.50E-01 | 1.47E-01 | -7.78E-02 | -3.62E-02 |
| B | -6.78E-02 | -2.61E-01 | -2.66E-01 | -1.51E-01 | 1.81E-02 | 7.16E-03 |
| C | 5.40E-03 | 4.11E-01 | 2.13E-01 | 9.19E-02 | -1.44E-03 | -1.38E-03 |
| D | 2.96E-01 | -3.89E-01 | -9.44E-02 | -3.52E-02 | 1.42E-05 | 1.41E-04 |
| E | -5.83E-01 | 2.68E-01 | 2.41E-02 | 8.22E-03 | 2.02E-06 | -5.42E-06 |
| F | 4.93E-01 | -1.08E-01 | -3.32E-03 | -1.05E-03 | | |
| G | -1.68E-01 | 1.77E-02 | 1.86E-04 | 5.56E-05 | | |

FIG. 20

LENS MODULE

CROSS-REFERENCE TO RELATED APPLICATION

This application claims the benefit of Korean Patent Application No. 10-2013-0159501, filed on Dec. 19, 2013, with the Korean Intellectual Property Office, the disclosure of which is incorporated in its entirety herein by reference.

BACKGROUND

The present technology generally relates to a lens module having an optical system including six lenses. Unless otherwise indicated herein, the materials described in this section are not prior art to the claims herein and are not admitted to be prior art by inclusion in this section.

Generally, a camera for a mobile communications terminal includes a lens module and an imaging device.

Here, the lens module includes a plurality of lenses and includes an optical system configured using the plurality of lenses and transferring an image of a subject to the imaging device. In addition, the imaging device is a device such as charge coupled device (CCD), or the like, and generally has a pixel size of 1.4 µm or more.

However, in accordance with a gradual decrease in sizes of mobile communications terminals and cameras included therein, a pixel size of the imaging device has been decreased to 1.12 µm or less. Therefore, development of a lens module having low F No. of 2.3 or less, at which high resolution may be implemented, even under the above-mentioned conditions has been demanded.

SUMMARY

Some embodiments of the present disclosure may provide a lens module capable of implementing high resolution.

According to an aspect of the present disclosure, a lens module may include: a first lens having positive refractive power; a second lens having refractive power, both surfaces thereof being convex; a third lens having refractive power; a fourth lens having positive refractive power; a fifth lens having refractive power; and a sixth lens having positive refractive power and having one or more inflection point formed on an image-side surface thereof.

According to some embodiments of the present disclosure, a lens module may include: a first lens having positive refractive power; a second lens having refractive power; a third lens having refractive power; a fourth lens having positive refractive power; a fifth lens having refractive power and having a meniscus shape convex toward an image; and a sixth lens having positive refractive power and having one or more inflection point formed on an image-side surface thereof.

The second lens may have positive refractive power.

The third lens may have negative refractive power.

The fifth lens may have negative refractive power.

An object-side surface of the first lens may be convex, and an image-side surface thereof may be concave.

An object-side surface of the third lens may be convex, and an image-side surface thereof may be concave.

An object-side surface of the fourth lens may be concave, and an image-side surface thereof may be convex.

An object-side surface of the sixth lens may be convex, and the image-side surface thereof may be concave.

BRIEF DESCRIPTION OF DRAWINGS

Embodiments of the present disclosure will be more clearly understood from the following description taken in conjunction with the accompanying drawings, in which:

FIG. 4 is a table illustrating optical characteristic values of the lens module shown in FIG. 1;

FIG. 5 is a table illustrating aspherical surface values of the lens module shown in FIG. 1;

FIG. 9 is a table illustrating optical characteristic values of the lens module shown in FIG. 6;

FIG. 10 is a table illustrating aspherical surface values of the lens module shown in FIG. 6;

FIG. 14 is a table illustrating optical characteristic values of the lens module shown in FIG. 11;

FIG. 15 is a table illustrating aspherical surface values of the lens module shown in FIG. 11;

FIG. 19 is a table illustrating optical characteristic values of the lens module shown in FIG. 16; and FIG. 20 is a table illustrating aspherical surface values of the lens module shown in FIG. 16.

DETAILED DESCRIPTION

Figure 1:
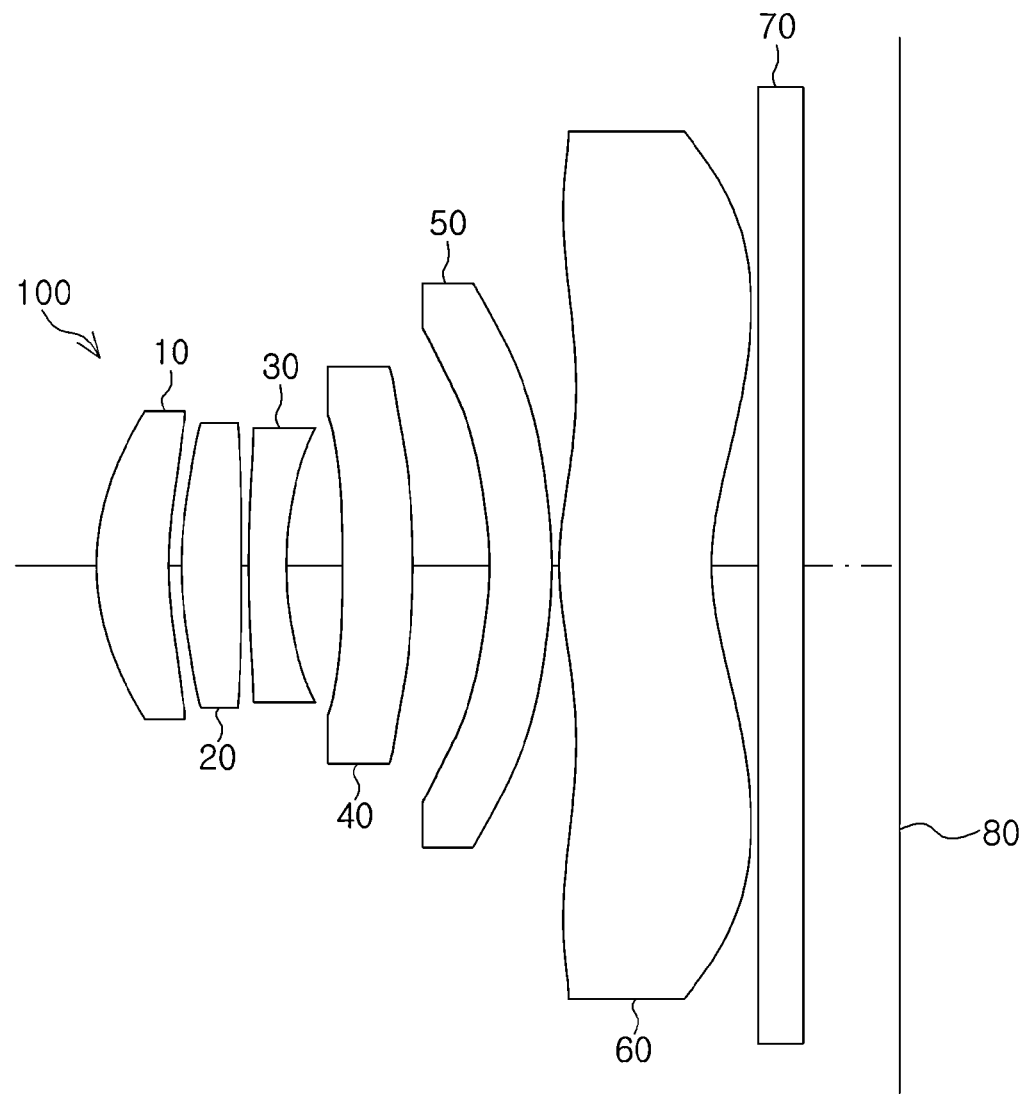
FIG. 1 is a configuration diagram of a lens module according to a first exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

In addition, in the present specification, it is to be noted that a first lens refers to a lens closest to an object, and a sixth lens refers to a lens closest to an image sensor. Further, it is to be noted that the term 'front' refers to a direction from the lens module toward an object, while the term 'rear' refers to a direction from the lens module toward the image sensor. In addition, it is to be noted that a first surface of each lens refers to a surface toward an object (or an object-side surface) and a second surface of each lens refers to a surface toward the image sensor (or an image-side surface). Further, in the present specification, units of all of radii of curvature, a thickness, a TTL, an SL, a DL, D12, D23, D34, D45, D56, an IMGH of the lens, an overall focal length of the lens module, and a focal length of each lens may be in millimeters (mm). Further, in descriptions of lens shapes, the meaning of one surface of the lens being convex is that an optical axis portion of a corresponding surface is convex, and the meaning of one surface of the lens being concave is that an optical axis portion of a corresponding portion is concave. Therefore, although it is described that one surface of the lens is convex, an edge portion of the lens may be concave. Likewise, although it is described that one surface of the lens is concave, an edge portion of the lens may be convex. In addition, it is to be noted that TTL, SL, DL, D12, D23, D34, D45, D56 are distances measured based on an optical axis of the lens. For example, D12 is a distance from the center of an optical axis of an image-side surface of a first lens to the center of an optical axis of an object-side surface of a second lens.

Figure 2:
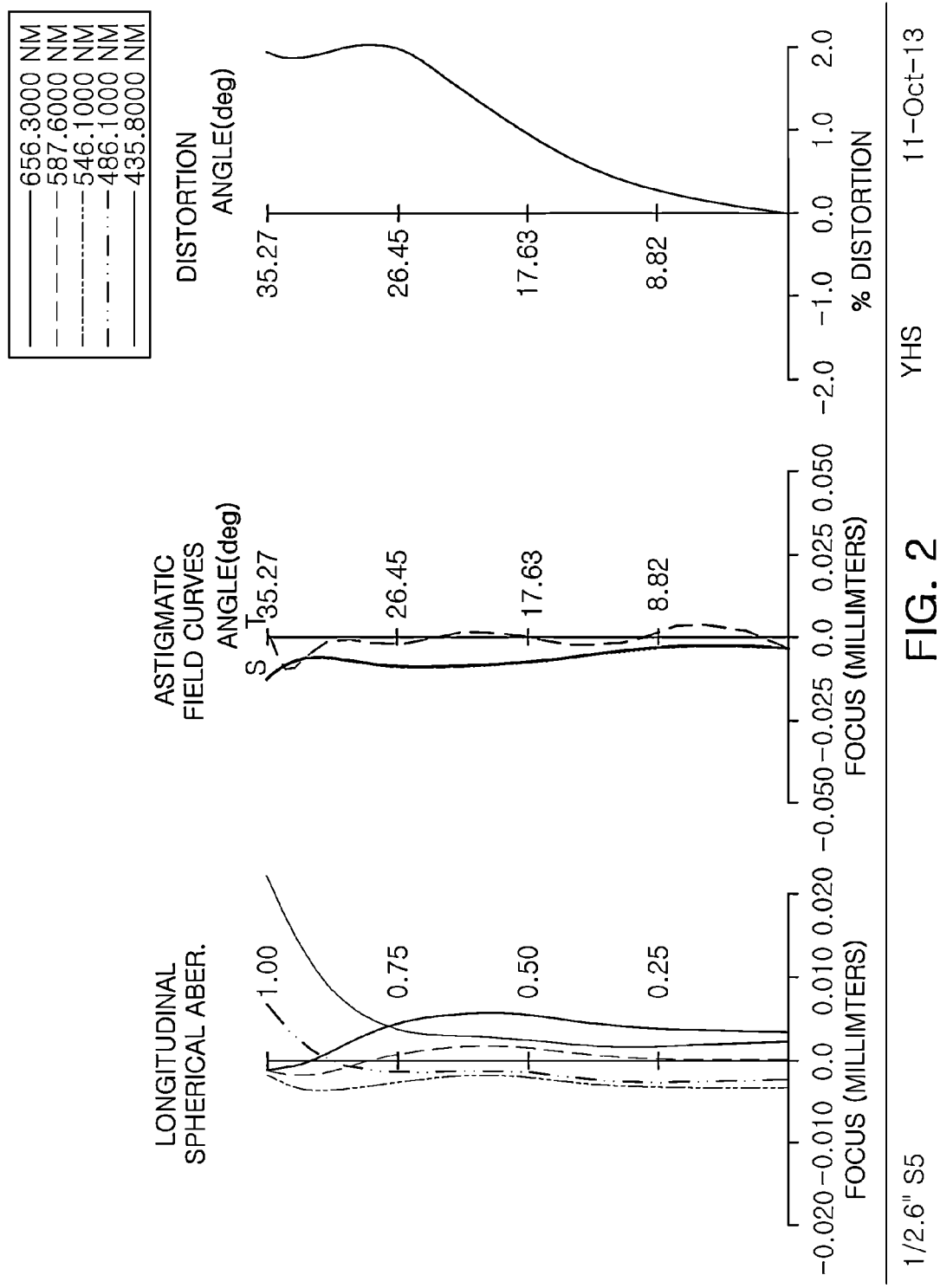
FIG. 2 is a graph illustrating aberration of the lens module shown in FIG. 1.
Figure 3:
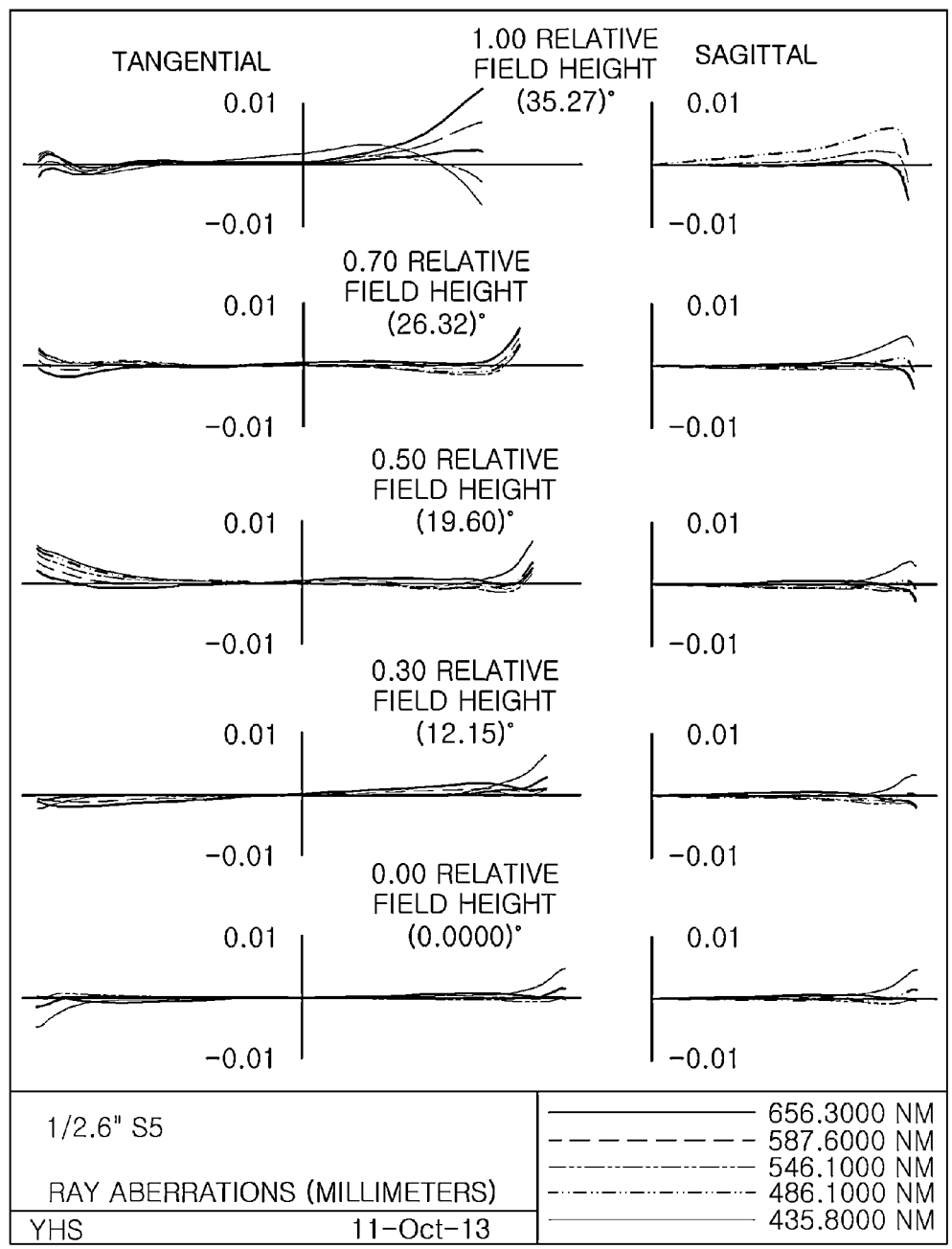
FIG. 3 is a graph illustrating coma aberration of the lens module shown in FIG. 1.
Figure 6:
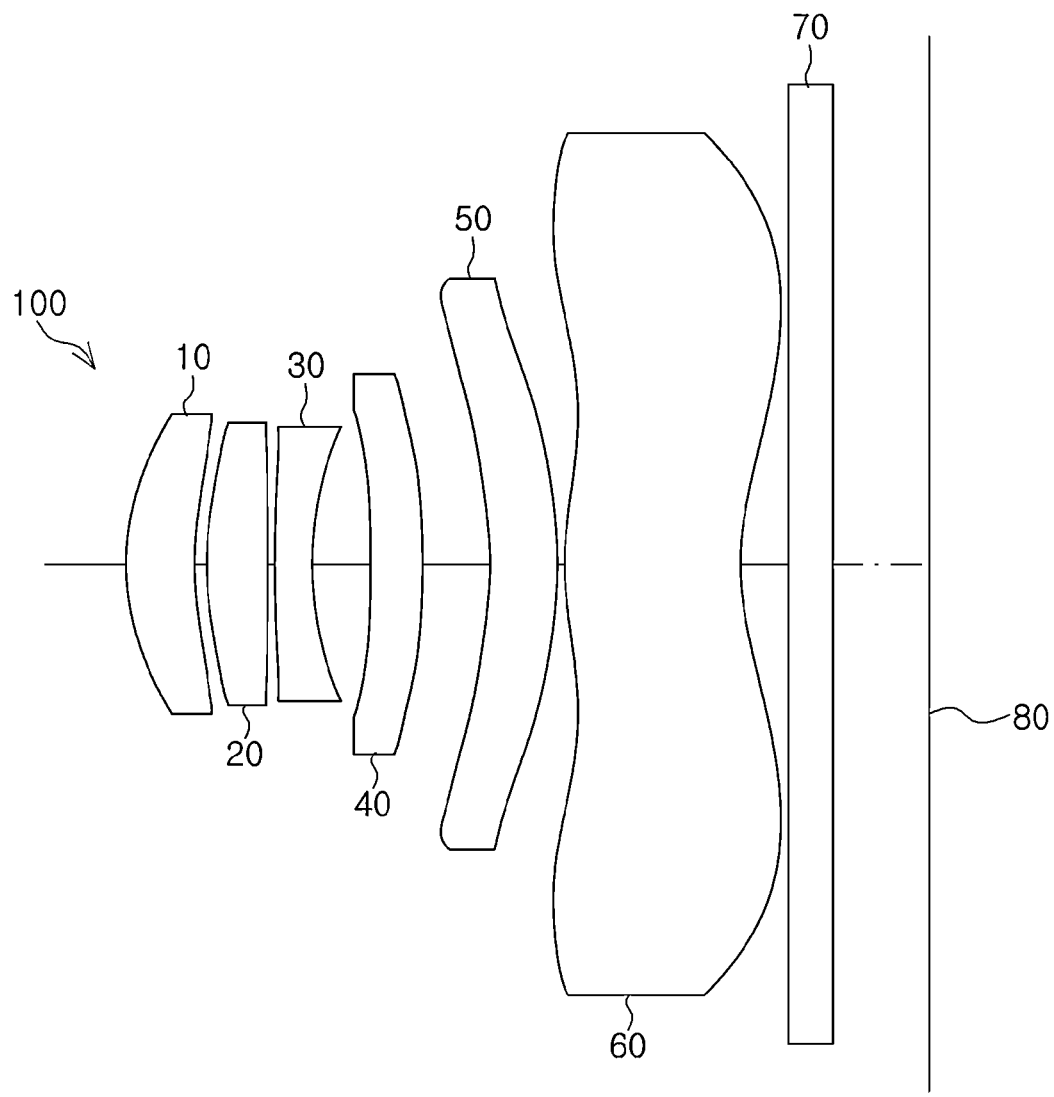
FIG. 6 is a configuration diagram of a lens module according to a second exemplary embodiment of the present disclosure.
Figure 7:
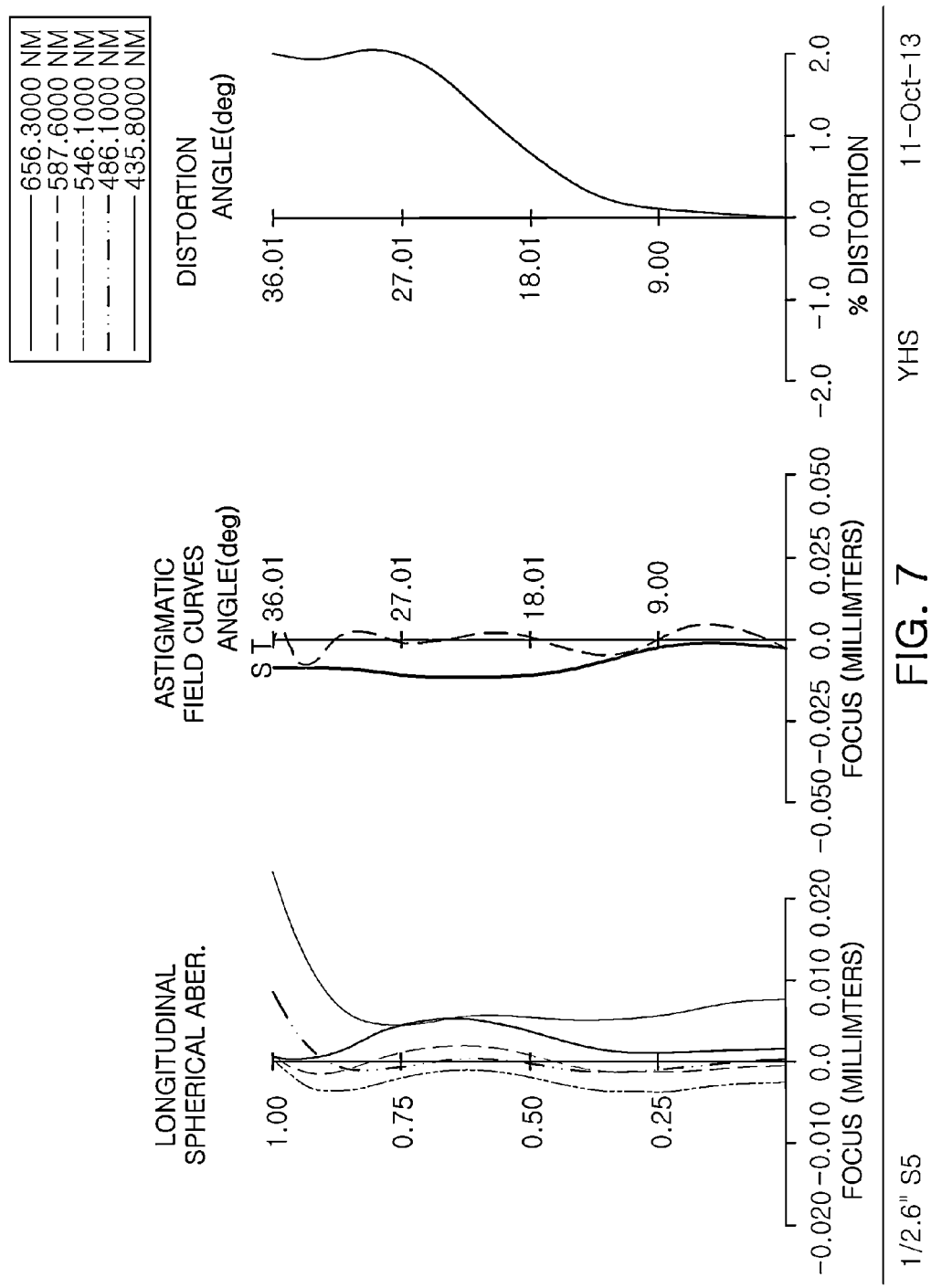
FIG. 7 is a graph illustrating aberration of the lens module shown in FIG. 6.
Figure 8:
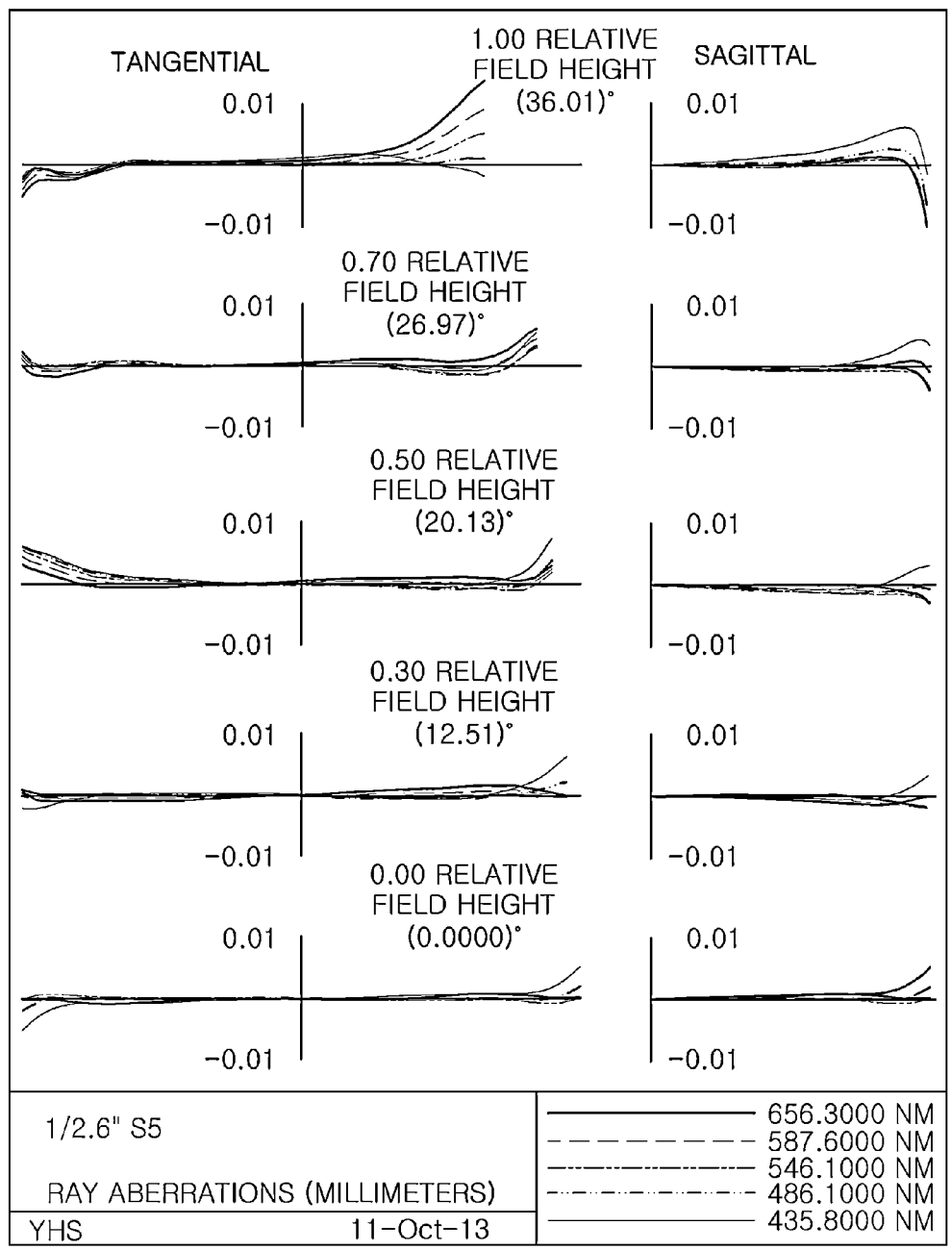
FIG. 8 is a graph illustrating coma aberration of the lens module shown in FIG. 6.
Figure 11:
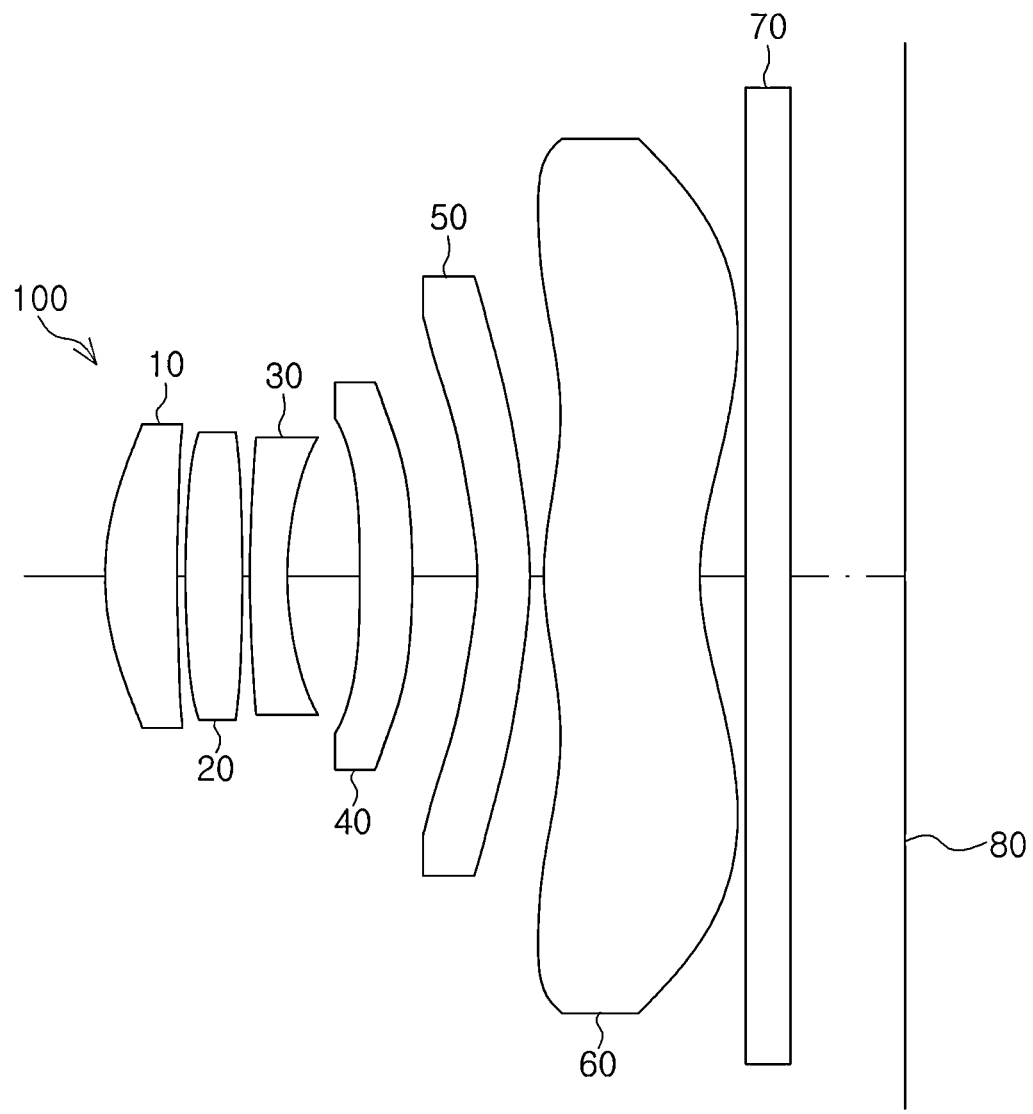
FIG. 11 is a configuration diagram of a lens module according to a third exemplary embodiment of the present disclosure.
Figure 12:
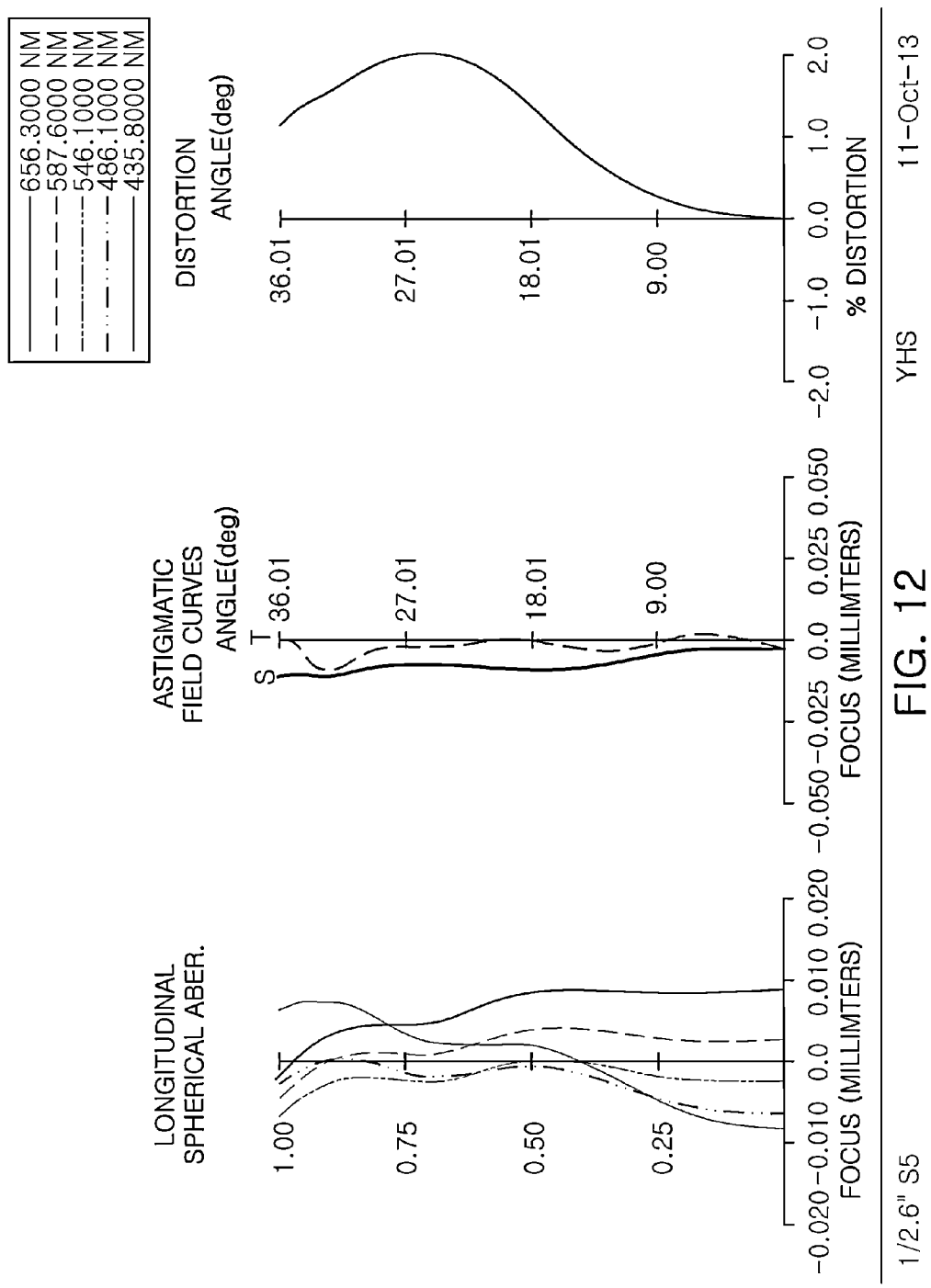
FIG. 12 is a graph illustrating aberration of the lens module shown in FIG. 11.
Figure 13:
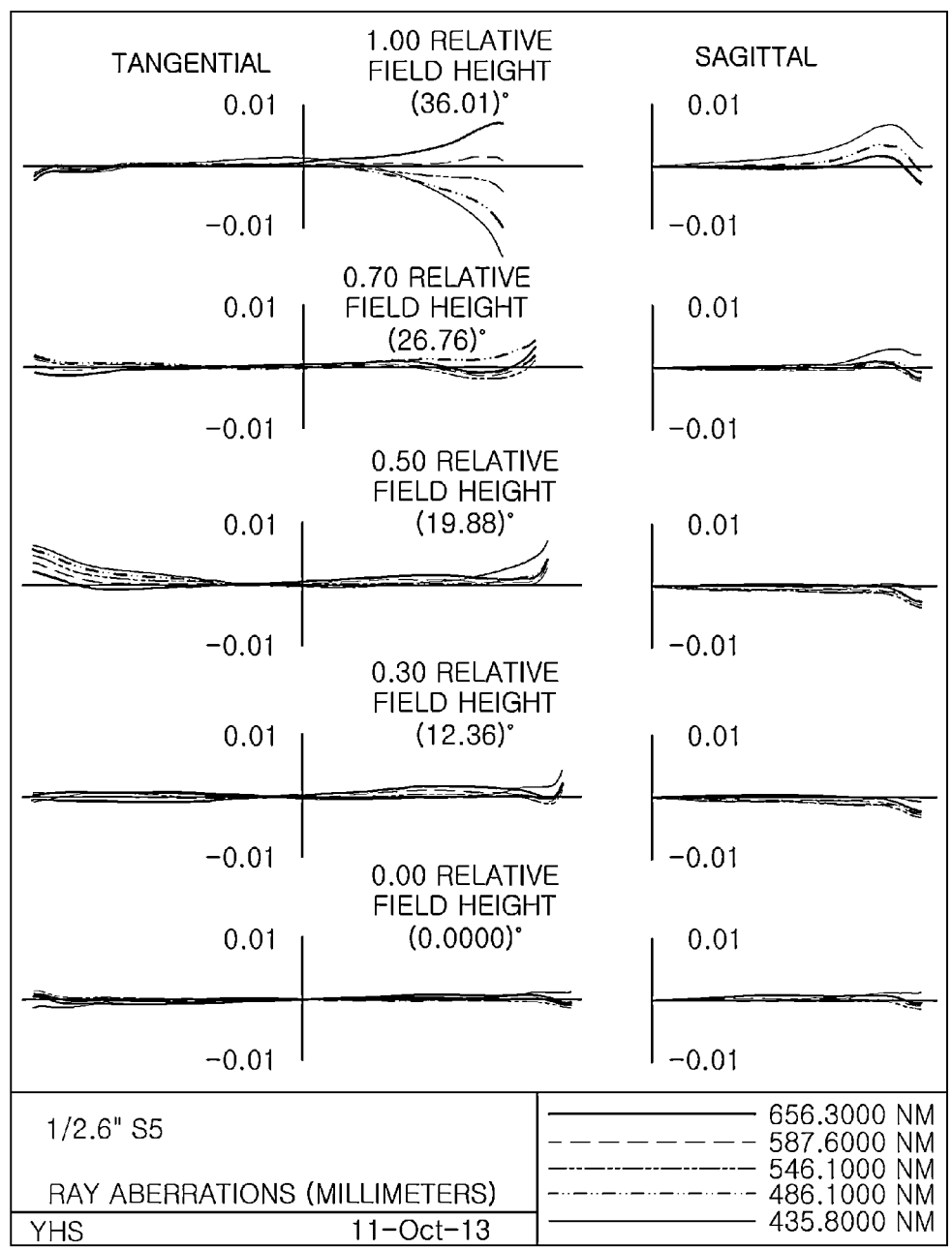
FIG. 13 is a graph illustrating coma aberration of the lens module shown in FIG. 11.
Figure 16:
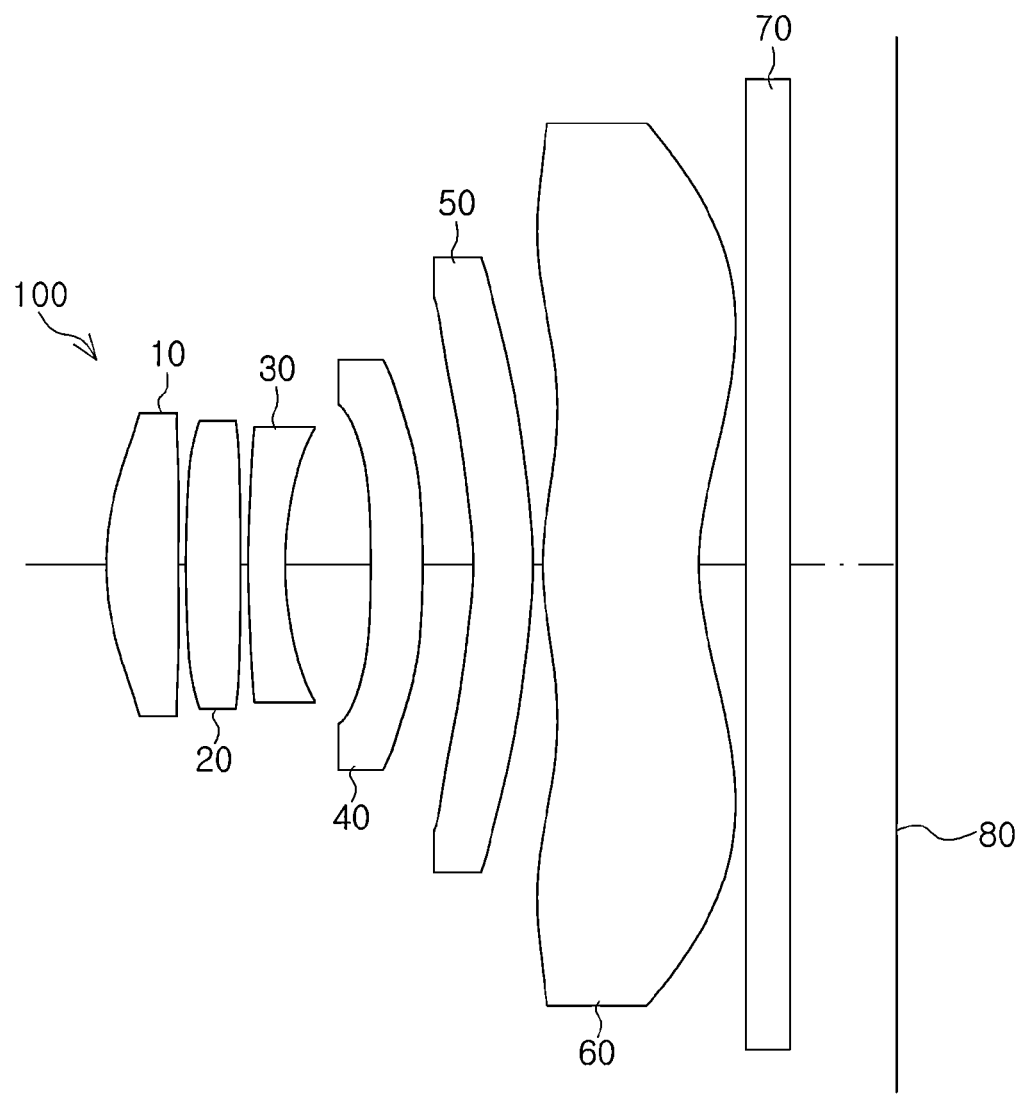
FIG. 16 is a configuration diagram of a lens module according to a fourth exemplary embodiment of the present disclosure.
Figure 17:
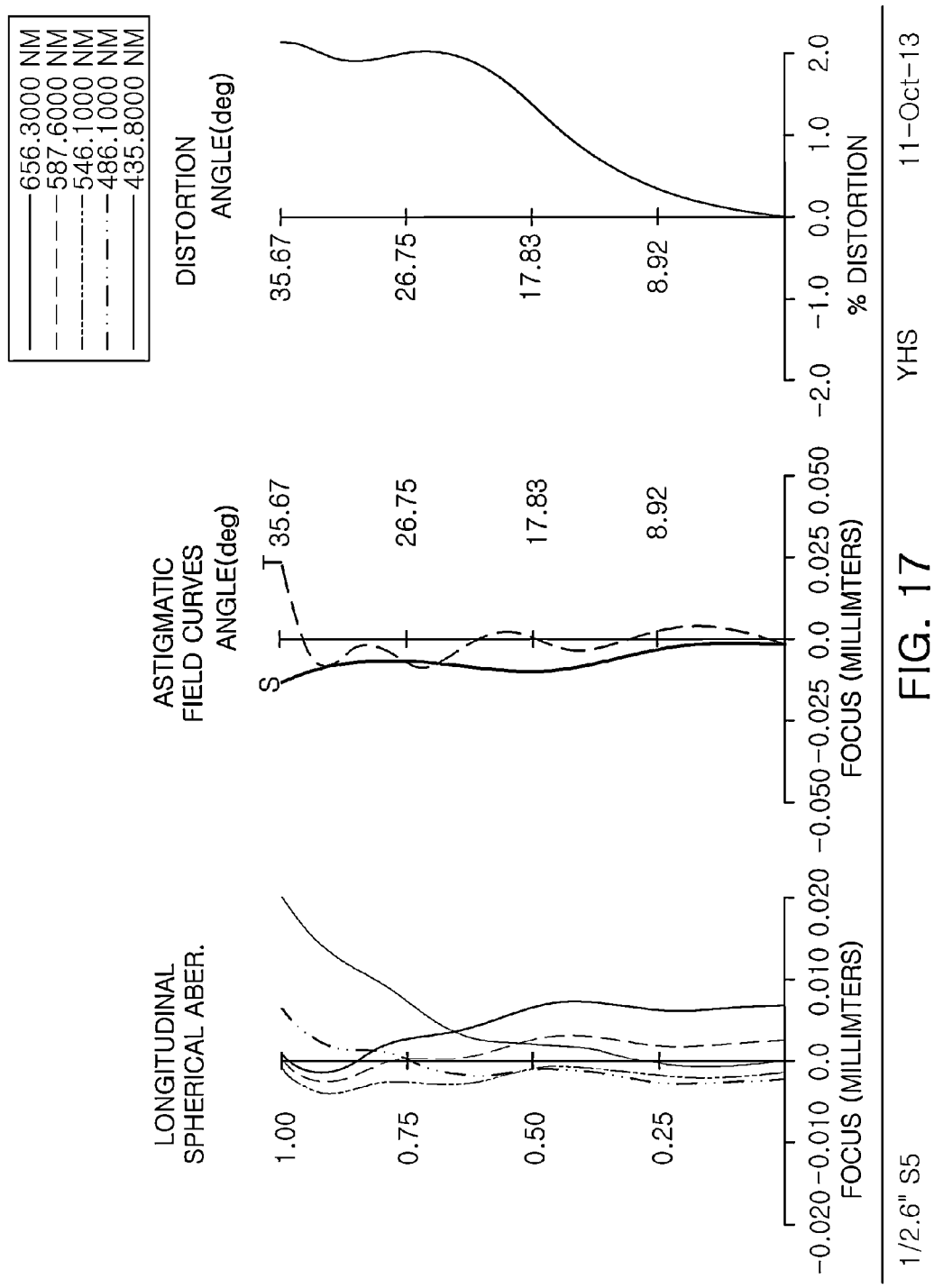
FIG. 17 is a graph illustrating aberration of the lens module shown in FIG. 16.
Figure 18:
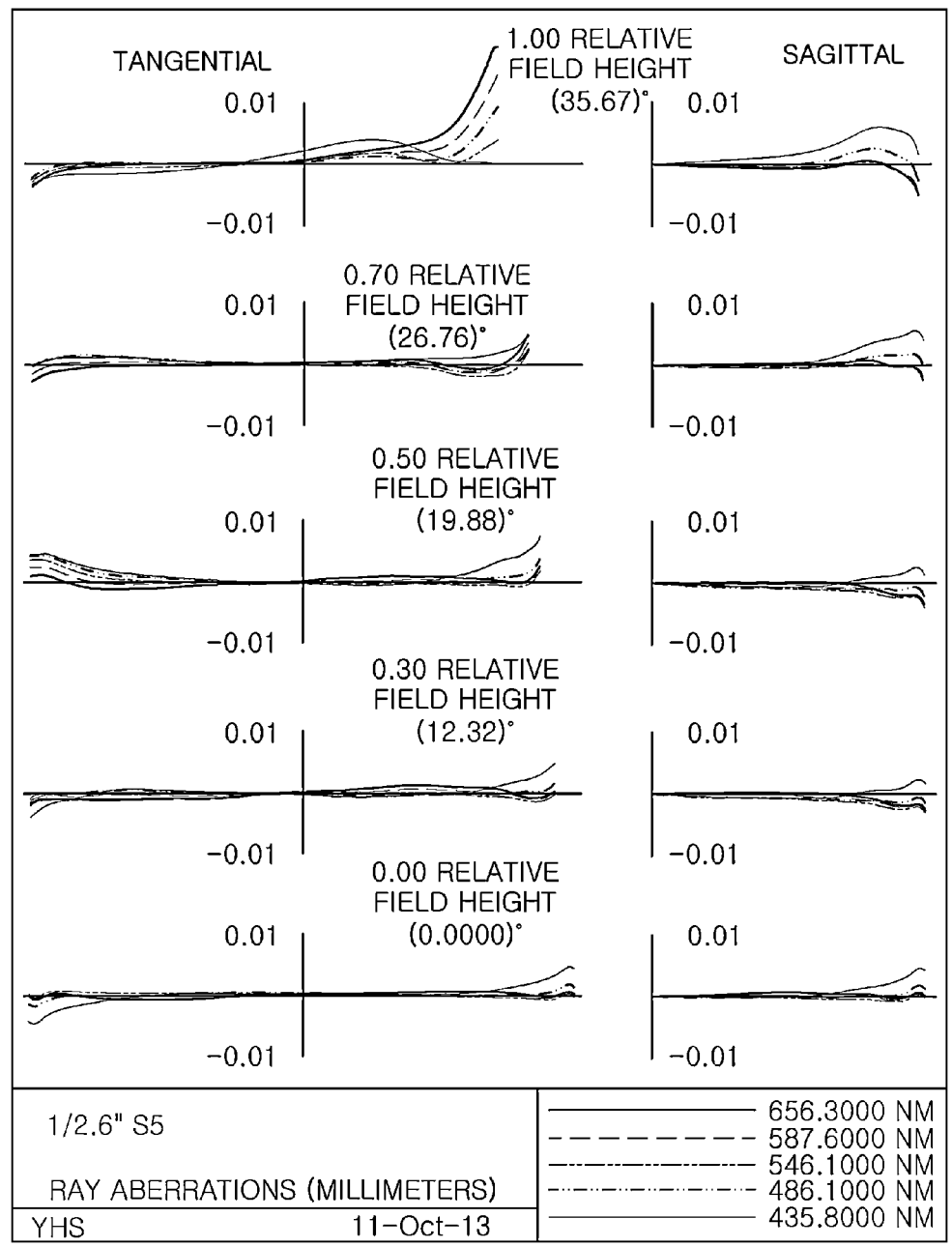
FIG. 18 is a graph illustrating coma aberration of the lens module shown in FIG. 16.

FIG. 1 is a configuration diagram of a lens module according to a first exemplary embodiment of the present disclosure; FIG. 2 is a graph illustrating aberration of the lens module shown in FIG. 1; FIG. 3 is a graph illustrating coma aberration of the lens module shown in FIG. 1; FIG. 4 is a table illustrating optical characteristic values of the lens module shown in FIG. 1; FIG. 5 is a table illustrating aspherical surface values of the lens module shown in FIG. 1; FIG. 6 is a configuration diagram of a lens module according to a second exemplary embodiment of the present disclosure; FIG. 7 is a graph illustrating aberration of the lens module shown in FIG. 6; FIG. 8 is a graph illustrating coma aberration of the lens module shown in FIG. 6; FIG. 9 is a table illustrating optical characteristic values of the lens module shown in FIG. 6; FIG. 10 is a table illustrating aspherical surface values of the lens module shown in FIG. 6; FIG. 11 is a configuration diagram of a lens module according to a third exemplary embodiment of the present disclosure; FIG. 12 is a graph illustrating aberration of the lens module shown in FIG. 11; FIG. 13 is a graph illustrating coma aberration of the lens module shown in FIG. 11; FIG. 14 is a table illustrating optical characteristic values of the lens module shown in FIG. 11; FIG. 15 is a table illustrating aspherical surface values of the lens module shown in FIG. 11; FIG. 16 is a configuration diagram of a lens module according to a fourth exemplary embodiment of the present disclosure; FIG. 17 is a graph illustrating aberration of the lens module shown in FIG. 16; FIG. 18 is a graph illustrating coma aberration of the lens module shown in FIG. 16; FIG. 19 is a table illustrating optical characteristic values of the lens module shown in FIG. 16; and FIG. 20 is a table illustrating aspherical surface values of the lens module shown in FIG. 16.

A lens module according to an exemplary embodiment of the present disclosure may include an optical system including six lenses. In detail, the lens module may include a first lens, a second lens, a third lens, a fourth lens, a fifth lens, and a sixth lens. However, the lens module is not limited to including only six lenses, but may further include other components, if necessary. For example, the lens module may include a stop for controlling an amount of light. In addition, the lens module may further include an infrared cut-off filter filtering an infrared light. Further, the lens module may further include an image sensor (that is, an imaging device) converting an image of a subject incident through an optical system into electrical signals. Further, the lens module may further include interval maintaining members adjusting intervals between lenses.

The first to sixth lenses configuring the optical system may be formed of plastic. In addition, at least one of the first to sixth lenses may have an aspherical surface. Further, the first to sixth lenses may have at least one aspherical surface. That is, at least one of first and second surfaces of the first to sixth lenses may be aspherical.

In addition, the optical system including the first to sixth lenses may have F No. of 2.4 or less. In this case, the subject may be clearly imaged. For example, the lens module according to the present disclosure may clearly image an image of the subject even under a low illumination condition (for example, 100 lux or less).

The lens module according to an exemplary embodiment of the present disclosure may satisfy the following Conditional Equation.

$$0.5 < f/f12 < 2.5 \quad \text{[Conditional Equation]}$$

Here, f is an overall focal length [mm] of the lens module, and f12 is a synthetic focal length [mm] of the first lens and the second lens. The Conditional Equation above may be a condition for optimizing a magnitude of refractive power of the first lens and the second lens for the overall focal length. For example, the first lens and the second lens satisfying the Conditional Equation above have low sensitivity, such that they may be easily manufactured and designed.

The lens module according to an exemplary embodiment of the present disclosure may satisfy the following Conditional Equation.

$$-2.5 < f/f34 < -0.4 \quad \text{[Conditional Equation]}$$

Here, f is the overall focal length [mm] of the lens module, and f34 is a synthetic focal length [mm] of the third lens and the fourth lens. The Conditional Equation above may be a condition for optimizing a magnitude of refractive power of the third lens and the fourth lens for the overall focal length. For example, the third lens and the fourth lens satisfying the Conditional Equation above may easily secure image formation performance.

The lens module according to an exemplary embodiment of the present disclosure may satisfy the following Conditional Equation.

$$0 < f/f1 < 1.5 \quad \text{[Conditional Equation]}$$

Here, f is the overall focal length [mm] of the lens module, and f1 is a focal length [mm] of the first lens. The Conditional Equation above may be a condition for optimizing the magnitude of the refractive power of the first lens for the overall focal length. For example, the first lens satisfying the Conditional Equation above has weak refraction performance, such that it may have low sensitivity.

The lens module according to an exemplary embodiment of the present disclosure may satisfy the following Conditional Equation.

$$|f/f3| > 0.6 \quad \text{[Conditional Equation]}$$

Here, f is the overall focal length [mm] of the lens module, and f3 is a focal length [mm] of the third lens. The Conditional Equation above may be a condition for optimizing a chromatic aberration improvement effect through the third lens. For example, the third lens satisfying the Conditional Equation above may expect an effective offset effect of chromatic aberration.

The lens module according to an exemplary embodiment of the present disclosure may satisfy the following Conditional Equation.

$$0.3 < f/f5 + f/f6 < 6.0 \quad \text{[Conditional Equation]}$$

Here, f is the overall focal length [mm] of the lens module, f5 is a focal length [mm] of the fifth lens, and f6 is a focal length [mm] of the sixth lens. The Conditional Equation above may be a condition for optimizing telephoto performance of the lens module. For example, the lens module satisfying the Conditional Equation above may be advantageous for imaging a subject positioned at a distant distance.

The lens module according to an exemplary embodiment of the present disclosure may satisfy the following Conditional Equation.

$$0.35 < TTL/2ImgH < 0.95 \quad \text{[Conditional Equation]}$$

Here, TTL is a distance [mm] from an object-side surface from the first lens to an image surface, and 2ImgH is a diagonal length [mm] of the image surface. The Conditional Equation above may be a condition for thinning the lens module. For example, the lens module satisfying the Conditional Equation above may be advantageous for being thinned.

The lens module according to an exemplary embodiment of the present disclosure may satisfy the following Conditional Equation.

$$65 < FOV < 88 \quad \text{[Conditional Equation]}$$

Here, FOV is a field of view of the lens module. The Conditional Equation above may be a condition for thinning the lens module and widening the field of view of the lens module. For example, the lens module satisfying the Conditional Equation above may be advantageous for thinning the lens module and imaging with a wide field of view.

The lens module according to an exemplary embodiment of the present disclosure may satisfy the following Conditional Equation.

$$10 < V12 - V34 < 45 \quad \text{[Conditional Equation]}$$

Here, V12 is an average of an abbe value of the first lens and an abbe value of the second lens, and V34 is an average of an abbe value of the third lens and an abbe value of the fourth lens. The Conditional Equation above may be a condition for optimizing a chromatic aberration improvement effect through the first to fourth lenses. For example, the lens module satisfying the Conditional Equation above may effectively decrease chromatic aberration in the first to third lenses.

The lens module according to an exemplary embodiment of the present disclosure may satisfy the following Conditional Equation.

$$0 < |f/f3| + |f/f4| < 3 \quad \text{[Conditional Equation]}$$

Here, f is the overall focal length [mm] of the lens module, f3 is the focal length [mm] of the third lens, and f4 is a focal length [mm] of the fourth lens. The Conditional Equation above may be a condition for optimizing an aberration improvement effect through the third and fourth lenses. For example, the third lens and the fourth lens satisfying the Conditional Equation above may effectively decrease aberration.

The lens module according to an exemplary embodiment of the present disclosure may satisfy the following Conditional Equation.

$$0.95 < TTL/f < 1.45 \quad \text{[Conditional Equation]}$$

Here, TTL is the distance [mm] from the object-side surface of the first lens to the image surface, and f is the overall focal length [mm] of the lens module. The Conditional Equation above may be a condition for making the lens module thin and telephoto. For example, the lens module satisfying the Conditional Equation above may be advantageous for being made to be thin and telephoto.

The lens module according to an exemplary embodiment of the present disclosure may satisfy the following Conditional Equation.

$$0.2 < |f/f1| + |f/f2| < 4 \quad \text{[Conditional Equation]}$$

Here, f is the overall focal length [mm] of the lens module, f1 is the focal length [mm] of the first lens, and f2 is a focal length [mm] of the second lens. The Conditional Equation above may be a condition for optimizing disposition of refractive power of the lens module.

The lens module according to an exemplary embodiment of the present disclosure may satisfy the following Conditional Equation.

$$0 < (|f1| + |f2|)/(|f3| + |f4|) < 30 \quad \text{[Conditional Equation]}$$

Here, f1 is the focal length [mm] of the first lens, f2 is the focal length [mm] of the second lens, f3 is the focal length [mm] of the third lens, and f4 is the focal length [mm] of the fourth lens. The Conditional Equation above may be a condition for optimizing disposition of refractive power of the lens module.

The lens module according to an exemplary embodiment of the present disclosure may satisfy the following Conditional Equation.

$$0.2 < |f/f4| + |f/f5| + |f/f6| < 7.5 \quad \text{[Conditional Equation]}$$

Here, f is the overall focal length [mm] of the lens module, f4 is the focal length [mm] of the fourth lens, f5 is the focal length [mm] of the fifth lens, and f6 is the focal length [mm] of the sixth lens. The Conditional Equation above may be a condition for optimizing disposition of refractive power of the lens module.

The lens module according to an exemplary embodiment of the present disclosure may satisfy the following Conditional Equation.

$$0.7 < DL/f < 1.2 \quad \text{[Conditional Equation]}$$

Here, f is the overall focal length [mm] of the lens module, and DL is a distance [mm] from the object-side surface of the first lens to an image-side surface of the sixth lens. The Conditional Equation above may be a condition for thinning the lens module. For example, the lens module satisfying the Conditional Equation above may be advantageous for being thinned and miniaturized.

The lens module according to an exemplary embodiment of the present disclosure may satisfy the following Conditional Equation.

$$|f1/f2| > 0.3 \quad \text{[Conditional Equation]}$$

Here, f1 is the focal length [mm] of the first lens, and f2 is the focal length [mm] of the second lens. The Conditional Equation above may be a condition for optimizing a design of the second lens for the first lens.

The lens module according to an exemplary embodiment of the present disclosure may satisfy the following Conditional Equation.

$$|f2/f3| < 10.0 \quad \text{[Conditional Equation]}$$

Here, f2 is the focal length [mm] of the second lens, and f3 is the focal length [mm] of the third lens. The Conditional Equation above may be a condition for optimizing a design of the third lens for the second lens.

The lens module according to an exemplary embodiment of the present disclosure may satisfy the following Conditional Equation.

$$|f3/f4| > 0.2 \quad \text{[Conditional Equation]}$$

Here, f3 is the focal length [mm] of the third lens, and f4 is the focal length [mm] of the fourth lens. The Conditional Equation above may be a condition for optimizing a design of the fourth lens for the third lens.

The lens module according to an exemplary embodiment of the present disclosure may satisfy the following Conditional Equation.

$$|f4/f5|>1.4 \quad \text{[Conditional Equation]}$$

Here, f4 is the focal length [mm] of the fourth lens, and f5 is the focal length [mm] of the fifth lens. The Conditional Equation above may be a condition for optimizing a design of the fifth lens for the fourth lens.

The lens module according to an exemplary embodiment of the present disclosure may satisfy the following Conditional Equation.

$$|f5/f6|<2.0 \quad \text{[Conditional Equation]}$$

Here, f5 is the focal length [mm] of the fifth lens, and f6 is the focal length [mm] of the sixth lens. The Conditional Equation above may be a condition for optimizing a design of the sixth lens for the fifth lens.

The lens module according to an exemplary embodiment of the present disclosure may satisfy the following Conditional Equation.

$$|f3/f5|>0.1 \quad \text{[Conditional Equation]}$$

Here, f3 is the focal length [mm] of the third lens, and f5 is the focal length [mm] of the fifth lens. The Conditional Equation above may be a condition for optimizing a design of the fifth lens for the third lens. For example, the third lens and the fifth lens satisfying the Conditional Equation above may effectively disperse incident light.

The lens module according to an exemplary embodiment of the present disclosure may satisfy the following Conditional Equation.

$$|f4/f6|>4.0 \quad \text{[Conditional Equation]}$$

Here, f4 is the focal length [mm] of the fourth lens, and f6 is the focal length [mm] of the sixth lens. The Conditional Equation above may be a condition for optimizing a design of the sixth lens for the fourth lens. For example, the fourth lens and the sixth lens satisfying the Conditional Equation above may allow for the effective convergence of incident light.

The lens module according to an exemplary embodiment of the present disclosure may satisfy the following Conditional Equation.

$$|f/f2|>0.1 \quad \text{[Conditional Equation]}$$

Here, f is the overall focal length [mm] of the lens module, and f2 is a focal length [mm] of the second lens. The Conditional Equation above may be a condition for optimizing performance of the refractive power of the second lens for the overall focal length.

The lens module according to an exemplary embodiment of the present disclosure may satisfy the following Conditional Equation.

$$|f/f4|>0.1 \quad \text{[Conditional Equation]}$$

Here, f is the overall focal length [mm] of the lens module, and f4 is the focal length [mm] of the fourth lens. The Conditional Equation above may be a condition for optimizing performance of the refractive power of the fourth lens for the overall focal length.

The lens module according to an exemplary embodiment of the present disclosure may satisfy the following Conditional Equation.

$$|f/f5|>0.1 \quad \text{[Conditional Equation]}$$

Here, f is the overall focal length [mm] of the lens module, and f5 is the focal length [mm] of the fifth lens. The Conditional Equation above may be a condition for optimizing performance of refractive power of the fifth lens for the overall focal length.

The lens module according to an exemplary embodiment of the present disclosure may satisfy the following Conditional Equation.

$$|f/f6|<0.2 \quad \text{[Conditional Equation]}$$

Here, f is the overall focal length [mm] of the lens module, and f6 is the focal length [mm] of the sixth lens. The Conditional Equation above may be a condition for optimizing performance of refractive power of the sixth lens for the overall focal length.

The lens module according to an exemplary embodiment of the present disclosure may satisfy the following Conditional Equation.

$$D12/D23>1.0 \quad \text{[Conditional Equation]}$$

Here, D12 is a distance [mm] from an image-side surface of the first lens to an object-side surface of the second lens, and D23 is a distance [mm] from an image-side surface of the second lens to an object-side surface of the third lens.

The lens module according to an exemplary embodiment of the present disclosure may satisfy the following Conditional Equation.

$$D23/D34<0.13 \quad \text{[Conditional Equation]}$$

Here, D23 is a distance [mm] from an image-side surface of the second lens to an object-side surface of the third lens, and D34 is a distance [mm] from an image-side surface of the third lens to an object-side surface of the fourth lens. The Conditional Equation above may be a condition for optimizing disposition of the third lens.

The lens module according to an exemplary embodiment of the present disclosure may satisfy the following Conditional Equation.

$$D34/D45<10.0 \quad \text{[Conditional Equation]}$$

Here, D34 is a distance [mm] from an image-side surface of the third lens to an object-side surface of the fourth lens, and D45 is a distance [mm] from an image-side surface of the fourth lens to an object-side surface of the fifth lens. The Conditional Equation above may be a condition for optimizing disposition of the fourth lens.

The lens module according to an exemplary embodiment of the present disclosure may satisfy the following Conditional Equation.

$$D45/D56>1.0 \quad \text{[Conditional Equation]}$$

Here, D45 is a distance [mm] from an image-side surface of the fourth lens to an object-side surface of the fifth lens, and D56 is a distance [mm] from an image-side surface of the fifth lens to an object-side surface of the sixth lens. The Conditional Equation above may be a condition for optimizing disposition of the fifth lens.

Next, the first to sixth lenses configuring the optical system will be described.

The first lens may have refractive power. For example, the first lens may have positive refractive power. A first surface of the first lens may be convex, and a second surface thereof may be concave. For example, the first lens may have a meniscus shape convex toward the object. At least one of the first and second surfaces of the first lens may be aspherical. For example, both surfaces of the first lens may be aspherical. The first lens may be formed of a material having high degrees of light transmissivity and workability. For example, the first lens may be formed of plastic. However, a material of the first lens is not limited to plastic. For example, the first lens may be formed of glass.

The second lens may have refractive power. For example, the second lens may have positive refractive power. In addition, the second lens may have stronger refractive power than that of the first lens. For example, a focal length of the second lens may be shorter than that of the first lens (that is, Conditional Equation: |f1|>|f2| may be satisfied). However, the first lens may have stronger refractive power than that of the second lens, if necessary. Both surfaces of the second lens may be convex. At least one of the first and second surfaces of the second lens may be aspherical. For example, both surfaces of the second lens may be aspherical. The second lens may be formed of a material having high degrees of light transmissivity and workability. For example, the second lens may be formed of plastic. However, a material of the second lens is not limited to plastic. For example, the second lens may be formed of glass.

The third lens may have refractive power. For example, the third lens may have negative refractive power. In addition, the third lens may have stronger refractive power than that of the fifth lens. For example, a focal length of the third lens may be shorter than that of the fifth lens (that is, Conditional Equation: |f5|>|f3| may be satisfied). A first surface of the third lens may be convex, and a second surface thereof may be concave. For example, the third lens may have a meniscus shape convex toward the object or a plano-convex shape convex toward the object. At least one of the first and second surfaces of the third lens may be aspherical. For example, both surfaces of the third lens may be aspherical. The third lens may be formed of a material having high degrees of light transmissivity and workability. For example, the third lens may be formed of plastic. However, a material of the third lens is not limited to plastic. For example, the third lens may be formed of glass. The third lens may have a diameter smaller than those of the first and second lenses. For example, an effective diameter (that is, a diameter of a portion at which effective light is substantially incident and refracted) of the third lens may be smaller than those of the first and second lenses.

The fourth lens may have refractive power. For example, the fourth lens may have positive refractive power. A first surface of the fourth lens may be concave, and a second surface thereof may be convex. For example, the fourth lens may have a meniscus shape convex toward the image or a plano-convex shape convex toward the image. At least one of the first and second surfaces of the fourth lens may be aspherical. For example, both surfaces of the fourth lens may be aspherical. The fourth lens may be formed of a material having high degrees of light transmissivity and workability. For example, the fourth lens may be formed of plastic. However, a material of the fourth lens is not limited to plastic. For example, the fourth lens may be formed of glass.

The fifth lens may have refractive power. For example, the fifth lens may have negative refractive power. A first surface of the fifth lens may be concave, and a second surface thereof may be convex. For example, the fifth lens may have a meniscus shape convex toward the image. At least one of the first and second surfaces of the fifth lens may be aspherical. For example, both surfaces of the fifth lens may be aspherical. The fifth lens may be formed of a material having high degrees of light transmissivity and workability. For example, the fifth lens may be formed of plastic. However, a material of the fifth lens is not limited to plastic. For example, the fifth lens may be formed of glass.

The sixth lens may have refractive power. For example, the sixth lens may have positive refractive power. A first surface of the sixth lens may be convex, and a second surface thereof may be concave. In addition, the sixth lens may have an inflection point and a turning point formed on at least one surface thereof. For example, the first surface of the sixth lens may be convex at the center of an optical axis thereof and may be concave at an edge thereof. Similarly, the second surface of the sixth lens may be concave at the center of the optical axis thereof and may be convex at an edge thereof. At least one of the first and second surfaces of the sixth lens may be aspherical. For example, both surfaces of the sixth lens may be aspherical. The sixth lens may be formed of a material having high degrees of light transmissivity and workability. For example, the sixth lens may be formed of plastic. However, a material of the sixth lens is not limited to plastic. For example, the sixth lens may be formed of glass.

Meanwhile, in the lens module according to exemplary embodiments of the present disclosure, the first to sixth lenses may be disposed so that effective diameters thereof become smaller from the first lens toward the third lens and become larger from the fourth lens toward the sixth lens. The optical system configured as described above may increase an amount of light incident to the image sensor to increase resolution of the lens module.

In addition, the lens module configured as described above may improve aberration, which causes image quality deterioration. Further, the lens module configured as described above may improve resolution. Further, the lens module configured as described above may be easy for lightness and be advantageous for decreasing a manufacturing cost.

A lens module according to a first exemplary embodiment of the present disclosure will be described with reference to FIGS. 1 through 5.

A lens module 100 according to a first exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80. In addition, the lens module 100 according to a first exemplary embodiment of the present disclosure may have F No. of 2.2 and a field of view (FOV) of 71.58 degrees.

In a first exemplary embodiment of the present disclosure, the first lens 10 may have positive refractive power. In addition, a first surface of the first lens 10 may be convex, and a second surface thereof may be concave. The second lens 20 may have positive refractive power. In addition, both surfaces of the second lens 20 may be convex. The third lens 30 may have negative refractive power. In addition, a first surface of the third lens 30 may be convex, and a second surface thereof may be concave. The fourth lens 40 may have positive refractive power. In addition, a first surface of the fourth lens 40 may be concave, and a second surface thereof may be convex. The fifth lens 50 may have negative refractive power. In addition, a first surface of the fifth lens 50 may be concave, and a second surface thereof may be convex. The sixth lens 60 may have positive refractive power. In addition, a first surface of the sixth lens 60 may be convex, and a second surface thereof may be concave. Further, the sixth lens 60 may have an inflection point. For example, the sixth lens 60 may have inflection points formed on the first and second surfaces thereof, respectively. Meanwhile, the fourth lens 40 may be disposed so as to be close to the third lens 30. For example, an air gap between the fourth lens 40 and the third lens 30 may be smaller than an air gap between the fourth lens 40 and the fifth lens 50.

The lens module 100 according to a first exemplary embodiment of the present disclosure may include one or more stops ST. For example, the stop ST may be disposed between the second lens 20 and the third lens 30.

The lens module configured as described above may have aberration characteristics and coma aberration characteristics as shown in FIGS. 2 and 3. For reference, FIG. 4 is a table illustrating radii of curvature, thicknesses and distances, refractive indices, abbe values of the respective lenses configuring the lens module, and FIG. 5 is a table illustrating aspherical surface values of the respective lenses.

A lens module according to a second exemplary embodiment of the present disclosure will be described with reference to FIGS. 6 through 10.

A lens module 100 according to a second exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80. In addition, the lens module 100 according to a second exemplary embodiment of the present disclosure may have F No. of 2.0 and a field of view (FOV) of 73.13 degrees.

In a second exemplary embodiment of the present disclosure, the first lens 10 may have positive refractive power. In addition, a first surface of the first lens 10 may be convex, and a second surface thereof may be concave. The second lens 20 may have positive refractive power. In addition, both surfaces of the second lens 20 may be convex. The third lens 30 may have negative refractive power. In addition, a first surface of the third lens 30 may be convex, and a second surface thereof may be concave. The fourth lens 40 may have positive refractive power. In addition, a first surface of the fourth lens 40 may be concave, and a second surface thereof may be convex. The fifth lens 50 may have negative refractive power. In addition, a first surface of the fifth lens 50 may be concave, and a second surface thereof may be convex. The sixth lens 60 may have positive refractive power. In addition, a first surface of the sixth lens 60 may be convex, and a second surface thereof may be concave. Further, the sixth lens 60 may have an inflection point. For example, the sixth lens 60 may have inflection points formed on the first and second surfaces thereof, respectively. Meanwhile, the fourth lens 40 may be disposed so as to be close to the third lens 30. For example, an air gap between the fourth lens 40 and the third lens 30 may be smaller than an air gap between the fourth lens 40 and the fifth lens 50.

The lens module 100 according to a second exemplary embodiment of the present disclosure may include one or more stops ST. For example, the stop ST may be disposed between the second lens 20 and the third lens 30.

The lens module configured as described above may have aberration characteristics and coma aberration characteristics as shown in FIGS. 7 and 8. For reference, FIG. 9 is a table illustrating radii of curvature, thicknesses and distances, refractive indices, abbe values of the respective lenses configuring the lens module, and FIG. 10 is a table illustrating aspherical surface values of the respective lenses.

A lens module according to a third exemplary embodiment of the present disclosure will be described with reference to FIGS. 11 through 15.

A lens module 100 according to a third exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80. In addition, the lens module 100 according to a third exemplary embodiment of the present disclosure may have F No. of 2.2 and a field of view (FOV) of 72.59 degrees.

In a third exemplary embodiment of the present disclosure, the first lens 10 may have positive refractive power. In addition, a first surface of the first lens 10 may be convex, and a second surface thereof may be concave. The second lens 20 may have positive refractive power. In addition, both surfaces of the second lens 20 may be convex. The third lens 30 may have negative refractive power. In addition, a first surface of the third lens 30 may be convex, and a second surface thereof may be concave. The fourth lens 40 may have positive refractive power. In addition, a first surface of the fourth lens 40 may be concave, and a second surface thereof may be convex.

The fifth lens 50 may have negative refractive power. In addition, a first surface of the fifth lens 50 may be concave, and a second surface thereof may be convex. The sixth lens 60 may have positive refractive power. In addition, a first surface of the sixth lens 60 may be convex, and a second surface thereof may be concave. Further, the sixth lens 60 may have an inflection point. For example, the sixth lens 60 may have inflection points formed on the first and second surfaces thereof, respectively.

Meanwhile, in a third exemplary embodiment of the present disclosure, the first lens may have stronger refractive power than that of the second lens. For example, a focal length of the first lens may be shorter than that of the second lens (that is, Conditional Equation: |f2|>|f1| may be satisfied). In addition, the fourth lens 40 may be disposed so as to be close to the fifth lens 50. For example, an air gap between the fourth lens 40 and the third lens 30 may be larger than an air gap between the fourth lens 40 and the fifth lens 50.

The lens module 100 according to a third exemplary embodiment of the present disclosure may include one or more stops ST. For example, the stop ST may be disposed between the second lens 20 and the third lens 30.

The lens module configured as described above may have aberration characteristics and coma aberration characteristics as shown in FIGS. 12 and 13. For reference, FIG. 14 is a table illustrating radii of curvature, thicknesses and distances, refractive indices, abbe values of the respective lenses configuring the lens module, and FIG. 15 is a table illustrating aspherical surface values of the respective lenses.

A lens module according to a fourth exemplary embodiment of the present disclosure will be described with reference to FIGS. 16 through 20.

A lens module 100 according to a fourth exemplary embodiment of the present disclosure may include an optical system including a first lens 10, a second lens 20, a third lens 30, a fourth lens 40, a fifth lens 50, and a sixth lens 60, and may further include an infrared cut-off filter 70, and an image sensor 80. In addition, the lens module 100 according to a fourth exemplary embodiment of the present disclosure may have F No. of 2.2 and a field of view (FOV) of 72.59 degrees.

In a fourth exemplary embodiment of the present disclosure, the first lens 10 may have positive refractive power. In addition, a first surface of the first lens 10 may be convex, and a second surface thereof may be concave. The second lens 20 may have positive refractive power. In addition, both surfaces of the second lens 20 may be convex. The third lens 30 may have negative refractive power. In addition, a first surface of the third lens 30 may be convex, and a second surface thereof may be concave. The fourth lens 40 may have positive refractive power. In addition, a first surface of the fourth lens 40 may be concave, and a second surface thereof may be convex. The fifth lens 50 may have negative refractive power. In addition, a first surface of the fifth lens 50 may be concave, and a second surface thereof may be convex. The sixth lens 60 may have positive refractive power. In addition, a first surface of the sixth lens 60 may be convex, and a second surface thereof may be concave. Further, the sixth lens 60 may have an inflection point. For example, the sixth lens 60 may have inflection points formed on the first and second surfaces thereof, respectively.

Meanwhile, in a fourth exemplary embodiment of the present disclosure, the first lens may have stronger refractive power than that of the second lens. For example, a focal length of the first lens may be shorter than that of the second lens (that is, Conditional Equation: $|f2|>|f1|$ may be satisfied). In addition, the fourth lens 40 may be disposed so as to be close to the fifth lens 50. For example, an air gap between the fourth lens 40 and the third lens 30 may be larger than an air gap between the fourth lens 40 and the fifth lens 50.

The lens module 100 according to a fourth exemplary embodiment of the present disclosure may include one or more stops ST. For example, the stop ST may be disposed between the second lens 20 and the third lens 30.

The lens module configured as described above may have aberration characteristics and coma aberration characteristics as shown in FIGS. 17 and 18. For reference, FIG. 19 is a table illustrating radii of curvature, thicknesses and distances, refractive indices, abbe values of the respective lenses configuring the lens module, and FIG. 20 is a table illustrating aspherical surface values of the respective lenses.

Exemplary embodiments of the present disclosure described above have main optical characteristics as shown in Table 1. In addition, exemplary embodiments of the present disclosure described above are slightly different in some optical characteristics from each other as shown in Table 2, but satisfy all of the following Conditional Equations.

TABLE 1

|  | First Exemplary Embodiment | Second Exemplary Embodiment | Third Exemplary Embodiment | Fourth Exemplary Embodiment |
| --- | --- | --- | --- | --- |
| f1 | 7.348 | 8.722 | 4.210 | 3.805 |
| f2 | 4.117 | 3.979 | 9.993 | 11.151 |
| f3 | −4.843 | −4.844 | −5.647 | −5.394 |
| f4 | 22.007 | 20.191 | 15.980 | 24.172 |
| f5 | −10.479 | −14.597 | −9.451 | −11.122 |
| f6 | 50.614 | 50.670 | 30.445 | 45.691 |
| f | 4.647 | 4.517 | 4.561 | 4.574 |
| FOV | 71.58 | 73.13 | 72.59 | 72.44 |
| F No. | 2.2 | 2.0 | 2.2 | 2.0 |

TABLE 2

| Conditional Equation | First Exemplary Embodiment | Second Exemplary Embodiment | Third Exemplary Embodiment | Fourth Exemplary Embodiment |
| --- | --- | --- | --- | --- |
| $0.5 < f/f12 < 2.5$ | 1.630 | 1.532 | 1.487 | 1.561 |
| $-2.5 < f/f34 < -0.4$ | −0.707 | −0.675 | −0.484 | −0.624 |
| $0 < f/f1 < 1.5$ | 0.619 | 0.518 | 1.083 | 1.202 |
| $|f/f3| > 0.6$ | 0.939 | 0.932 | 0.808 | 0.848 |
| $0.3 < f/F5 + f/F6 < 6.0$ | 0.524 | 0.399 | 0.632 | 0.511 |
| $0.35 < TTL/2ImgH < 0.95$ | 0.806 | 0.788 | 0.767 | 0.776 |
| $65 < FOV < 88$ | 72.76 | 74.39 | 73.86 | 73.70 |
| $10 < v12 - v34 < 45$ | 33.33 | 16.67 | 33.33 | 33.33 |
| $0 < |f/f3| + |f/f4| < 3$ | 1.145 | 1.156 | 1.093 | 1.037 |
| $0.95 < TTL/f < 1.45$ | 1.188 | 1.195 | 1.153 | 1.163 |
| $0.2 < |f/f1| + |f/f2| < 4$ | 1.723 | 1.653 | 1.540 | 1.612 |
| $0 < (|f1| + |f2|)/(|f3| + |f4|) < 30$ | 0.427 | 0.507 | 0.657 | 0.506 |
| $0.20 < |f/f4| + |f/f5| + |f/f6| < 7.5$ | 0.730 | 0.622 | 0.918 | 0.701 |
| $0.7 < DL/f < 1.2$ | 0.909 | 0.914 | 0.867 | 0.872 |
| $|f1/f2| > 0.3$ | 1.785 | 2.192 | 0.421 | 0.341 |
| $|f2/f3| < 10.0$ | 0.850 | 0.821 | 1.769 | 2.067 |
| $|f3/f4| > 0.2$ | 0.220 | 0.240 | 0.353 | 0.223 |
| $|f4/f5| > 1.4$ | 2.100 | 1.383 | 1.691 | 2.173 |
| $|f5/f6| < 2.0$ | 0.207 | 0.288 | 0.310 | 0.243 |
| $|f3/f5| > 0.1$ | 0.462 | 0.332 | 0.598 | 0.485 |
| $|f4/f6| < 4.0$ | 0.435 | 0.398 | 0.525 | 0.529 |
| $|f/f2| > 0.1$ | 1.104 | 1.135 | 0.456 | 0.410 |
| $|f/f4| > 0.1$ | 0.207 | 0.224 | 0.285 | 0.189 |
| $|f/f5| > 0.1$ | 0.434 | 0.309 | 0.483 | 0.411 |
| $|f/f6| < 0.2$ | 0.090 | 0.089 | 0.150 | 0.100 |
| $D1/D2 > 1.0$ | 1.736 | 1.640 | 1.122 | 1.000 |
| $D2/D3 < 0.13$ | 0.132 | 0.128 | 0.104 | 0.087 |
| $D3/D4 < 10.0$ | 0.734 | 0.862 | 1.118 | 1.681 |
| $D4/D5 > 1.0$ | 10.323 | 9.079 | 4.641 | 5.061 |

As set forth above, according to exemplary embodiments of the present disclosure, high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
a first lens having positive refractive power;
a second lens having refractive power, both surfaces thereof being convex;
a third lens having refractive power;
a fourth lens having positive refractive power of which an object-side surface is concave;
a fifth lens having refractive power; and
a sixth lens having positive refractive power and having one or more inflection point formed on an image-side surface thereof, wherein the first, second, third, fourth, fifth and sixth lenses are disposed in a sequential order from the first lens to the sixth lens.

2. The lens module of claim 1, wherein the second lens has positive refractive power.

3. The lens module of claim 1, wherein the third lens has negative refractive power.

4. The lens module of claim 1, wherein the fifth lens has negative refractive power.

5. The lens module of claim 1, wherein an object-side surface of the first lens is convex, and an image-side surface thereof is concave.

6. The lens module of claim 1, wherein an object-side surface of the third lens is convex, and an image-side surface thereof is concave.

7. The lens module of claim 1, wherein an image-side surface thereof is convex.

8. The lens module of claim 1, wherein an object-side surface of the sixth lens is convex, and the image-side surface thereof is concave.

9. The lens module of claim 1, wherein the following Conditional Equation is satisfied:

[Conditional Equation] $0.5<f/f12<2.5$ where f is an overall focal length of the lens module, and f12 is a synthetic focal length of the first lens and the second lens.

10. The lens module of claim 1, wherein the following Conditional Equation is satisfied:

[Conditional Equation] $-2.5 < f/f34 < -0.4$ where f is an overall focal length of the lens module, and f34 is a synthetic focal length of the third lens and the fourth lens.

11. The lens module of claim 1, wherein the following Conditional Equation is satisfied:

[Conditional Equation] $0 < f/f1 < 1.5$ where f is an overall focal length of the lens module, and f1 is a focal length of the first lens.

12. The lens module of claim 1, wherein the following Conditional Equation is satisfied:

[Conditional Equation] $|f/f3| > 0.6$ where f is an overall focal length of the lens module, and f3 is a focal length of the third lens.

13. The lens module of claim 1, wherein the following Conditional Equation is satisfied:

[Conditional Equation] $0.35 < TTL/2ImgH < 0.95$ where TTL is a distance from an object-side surface from the first lens to an image surface, and 2ImgH is a diagonal length of the image surface.

14. The lens module of claim 1, wherein the following Conditional Equation is satisfied:

[Conditional Equation] $65 < FOV < 88$ where FOV is a field of view of the lens module.

15. The lens module of claim 1, wherein the following Conditional Equation is satisfied:

[Conditional Equation] $10 < V12 - V34 < 45$ where V12 is an average of an abbe value of the first lens and an abbe value of the second lens, and V34 is an average of an abbe value of the third lens and an abbe value of the fourth lens.

16. The lens module of claim 1, wherein the following Conditional Equation is satisfied:

[Conditional Equation] $0 < |f/f3| + |f/f4| < 3$ where f is an overall focal length of the lens module, f3 is a focal length of the third lens, and f4 is a focal length of the fourth lens.

17. The lens module of claim 1, wherein the following Conditional Equation is satisfied:

[Conditional Equation] $0.95 < TTL/f < 1.45$ where TTL is a distance from an object-side surface of the first lens to an image surface, and f is an overall focal length of the lens module.

18. The lens module of claim 1, wherein the following Conditional Equation is satisfied:

[Conditional Equation] $0.2 < |f/f1| + |f/f2| < 4$ where f is an overall focal length of the lens module, f1 is a focal length of the first lens, and f2 is a focal length of the second lens.

19. The lens module of claim 1, wherein the following Conditional Equation is satisfied:

[Conditional Equation] $0 < (|f1| + |f2|)/(|f3| + |f4|) < 30$ where f1 is a focal length of the first lens, f2 is a focal length of the second lens, f3 is a focal length of the third lens, and f4 is a focal length of the fourth lens.

20. The lens module of claim 1, wherein the following Conditional Equation is satisfied:

[Conditional Equation] $0.2 < |f/f4| + |f/f5| + |f/f6| < 7.5$ where f is an overall focal length of the lens module, f4 is a focal length of the fourth lens, f5 is a focal length of the fifth lens, and f6 is a focal length of the sixth lens.

21. The lens module of claim 1, wherein the following Conditional Equation is satisfied:

[Conditional Equation] $0.7 < DL/f < 1.2$ where f is an overall focal length of the lens module, and DL is a distance from an object-side surface of the first lens to the image-side surface of the sixth lens.

22. The lens module of claim 1, wherein the following Conditional Equation is satisfied:

[Conditional Equation] $|f1/f2| > 0.3$ where f1 is a focal length of the first lens, and f2 is a focal length of the second lens.

23. The lens module of claim 1, wherein the following Conditional Equation is satisfied:

[Conditional Equation] $|f2/f3| < 10.0$ where f2 is a focal length of the second lens, and f3 is a focal length of the third lens.

24. The lens module of claim 1, wherein the following Conditional Equation is satisfied:

[Conditional Equation] $|f3/f4| > 0.2$ where f3 is a focal length of the third lens, and f4 is a focal length of the fourth lens.

25. The lens module of claim 1, wherein the following Conditional Equation is satisfied:

[Conditional Equation] $|f4/f5| > 1.4$ where f4 is a focal length of the fourth lens, and f5 is a focal length of the fifth lens.

26. The lens module of claim 1, wherein the following Conditional Equation is satisfied:

[Conditional Equation] $|f5/f6| < 2.0$ where f5 is a focal length of the fifth lens, and f6 is a focal length of the sixth lens.

27. The lens module of claim 1, wherein the following Conditional Equation is satisfied:

[Conditional Equation] $|f3/f5| > 0.1$ where f3 is a focal length of the third lens, and f5 is a focal length of the fifth lens.

28. The lens module of claim 1, wherein the following Conditional Equation is satisfied:

[Conditional Equation] $|f4/f6| < 4.0$ where f4 is a focal length of the fourth lens, and f6 is a focal length of the sixth lens.

29. The lens module of claim 1, wherein the following Conditional Equation is satisfied:

[Conditional Equation] $|f/f2| > 0.1$ where f is an overall focal length of the lens module, and f2 is a focal length of the second lens.

30. The lens module of claim 1, wherein the following Conditional Equation is satisfied:

[Conditional Equation] $|f/f4| > 0.1$ where f is an overall focal length of the lens module, and f4 is a focal length of the fourth lens.

31. The lens module of claim 1, wherein the following Conditional Equation is satisfied:

[Conditional Equation] $|f/f5| > 0.1$ where f is an overall focal length of the lens module, and f5 is a focal length of the fifth lens.

32. The lens module of claim 1, wherein the following Conditional Equation is satisfied:

[Conditional Equation] $|f/f6| < 0.2$ where f is an overall focal length of the lens module, and f6 is a focal length of the sixth lens.

33. The lens module of claim 1, wherein the following Conditional Equation is satisfied:

[Conditional Equation] $D12/D23 > 1.0$ where D12 is a distance from an image-side surface of the first lens to an object-side surface of the second lens, and D23 is a distance from an image-side surface of the second lens to an object-side surface of the third lens.

34. The lens module of claim 1, wherein the following Conditional Equation is satisfied:

[Conditional Equation] D23/D34<0.13 where D23 is a distance from an image-side surface of the second lens to an object-side surface of the third lens, and D34 is a distance from an image-side surface of the third lens to an object-side surface of the fourth lens.

35. The lens module of claim 1, wherein the following Conditional Equation is satisfied:

[Conditional Equation] D34/D45<10.0 where D34 is a distance from an image-side surface of the third lens to an object-side surface of the fourth lens, and D45 is a distance from an image-side surface of the fourth lens to an object-side surface of the fifth lens.

36. The lens module of claim 1, wherein the following Conditional Equation is satisfied:

[Conditional Equation] D45/D56>1.0 where D45 is a distance from an image-side surface of the fourth lens to an object-side surface of the fifth lens, and D56 is a distance from an image-side surface of the fifth lens to an object-side surface of the sixth lens.

37. A lens module comprising:
a first lens having positive refractive power;
a second lens having refractive power of which an image side surface is convex;
a third lens having refractive power;
a fourth lens having positive refractive power;
a fifth lens having refractive power and having a meniscus shape convex toward an image; and
a sixth lens having positive refractive power and having one or more inflection point formed on an image-side surface thereof,
wherein the first, second, third, fourth, fifth and sixth lenses are disposed in a sequential order from the first lens to the sixth lens,
and the lens module has a total of six lenses with refractive power.

38. The lens module of claim 37, wherein the second lens has positive refractive power.

39. The lens module of claim 37, wherein the third lens has negative refractive power.

40. The lens module of claim 37, wherein the fifth lens has negative refractive power.

41. The lens module of claim 37, wherein an object-side surface of the first lens is convex, and an image-side surface thereof is concave.

42. The lens module of claim 37, wherein an object-side surface of the third lens is convex, and an image-side surface thereof is concave.

43. The lens module of claim 37, wherein an object-side surface of the fourth lens is concave, and an image-side surface thereof is convex.

44. The lens module of claim 37, wherein an object-side surface of the sixth lens is convex, and the image-side surface thereof is concave.

45. The lens module of claim 37, wherein the following Conditional Equation is satisfied:

[Conditional Equation] 0.5<f/f12<2.5 where f is an overall focal length of the lens module, and f12 is a synthetic focal length of the first lens and the second lens.

46. The lens module of claim 37, wherein the following Conditional Equation is satisfied:

[Conditional Equation] −2.5<f/f34<−0.4 where f is an overall focal length of the lens module, and f34 is a synthetic focal length of the third lens and the fourth lens.

47. The lens module of claim 37, wherein the following Conditional Equation is satisfied:

[Conditional Equation] 0<f/f1<1.5 where f is an overall focal length of the lens module, and f1 is a focal length of the first lens.

48. The lens module of claim 37, wherein the following Conditional Equation is satisfied:

[Conditional Equation] |f/f3|>0.6 where f is an overall focal length of the lens module, and f3 is a focal length of the third lens.

49. The lens module of claim 37, wherein the following Conditional Equation is satisfied:

[Conditional Equation] 0.35<TTL/2ImgH<0.95 where TTL is a distance from an object-side surface from the first lens to an image surface, and 2ImgH is a diagonal length of the image surface.

50. The lens module of claim 37, wherein the following Conditional Equation is satisfied:

[Conditional Equation] 65<FOV<88 where FOV is a field of view of the lens module.

51. The lens module of claim 37, wherein the following Conditional Equation is satisfied:

[Conditional Equation] 10<V12−V34<45 where V12 is an average of an abbe value of the first lens and an abbe value of the second lens, and V34 is an average of an abbe value of the third lens and an abbe value of the fourth lens.

52. The lens module of claim 37, wherein the following Conditional Equation is satisfied:

[Conditional Equation] 0<|f/f3|+||f/f4|<3 where f is an overall focal length of the lens module, f3 is a focal length of the third lens, and f4 is a focal length of the fourth lens.

53. The lens module of claim 37, wherein the following Conditional Equation is satisfied:

[Conditional Equation] 0.95<TTL/f<1.45 where TTL is a distance from an object-side surface of the first lens to an image surface, and f is an overall focal length of the lens module.

54. The lens module of claim 37, wherein the following Conditional Equation is satisfied:

[Conditional Equation] 0.2<|f/f1|+|f/f2|<4 where f is an overall focal length of the lens module, f1 is a focal length of the first lens, and f2 is a focal length of the second lens.

55. The lens module of claim 37, wherein the following Conditional Equation is satisfied:

[Conditional Equation] 0<(|f1|+|f2|)/(|f3|+|f4|)<30 where f1 is a focal length of the first lens, f2 is a focal length of the second lens, f3 is a focal length of the third lens, and f4 is a focal length of the fourth lens.

56. The lens module of claim 37, wherein the following Conditional Equation is satisfied:

[Conditional Equation] 0.2<|f/f4|+|f/f5|+|f/f6|<7.5 where f is an overall focal length of the lens module, f4 is a focal length of the fourth lens, f5 is a focal length of the fifth lens, and f6 is a focal length of the sixth lens.

57. The lens module of claim 37, wherein the following Conditional Equation is satisfied:

[Conditional Equation] 0.7<DL/f<1.2 where f is an overall focal length of the lens module, and DL is a distance from an object-side surface of the first lens to the image-side surface of the sixth lens.

* * * * *